(12) United States Patent  
Bassett

(10) Patent No.: US 8,344,528 B2
(45) Date of Patent: Jan. 1, 2013

(54) WASTE OIL ELECTRICAL GENERATION SYSTEMS

(76) Inventor: Terry Edgar Bassett, Tempe, AZ (US)

( * ) Notice: Subject to any disclaimer, the term of this patent is extended or adjusted under 35 U.S.C. 154(b) by 410 days.

(21) Appl. No.: 12/826,634

(22) Filed: Jun. 29, 2010

(65) Prior Publication Data

US 2011/0000407 A1  Jan. 6, 2011

Related U.S. Application Data

(60) Provisional application No. 61/222,211, filed on Jul. 1, 2009, provisional application No. 61/292,480, filed on Jan. 5, 2010.

(51) Int. Cl.
*F02B 63/04* (2006.01)
(52) U.S. Cl. ..................................................... 290/1 R
(58) Field of Classification Search .............. 290/1 R, 290/52, 2, 1 A; 60/648, 670, 645, 39.53, 60/39.83
See application file for complete search history.

(56) References Cited

U.S. PATENT DOCUMENTS

| | | | |
|---|---|---|---|
| 3,678,284 A | 7/1972 | Peters | |
| 3,696,021 A | 10/1972 | Cole et al. | |
| 4,031,404 A | 6/1977 | Martz et al. | |
| 4,049,299 A | 9/1977 | Rigollot | |
| 4,161,657 A | 7/1979 | Shaffer, Jr. | |
| 4,264,826 A * | 4/1981 | Ullmann | 290/2 |
| 4,392,353 A | 7/1983 | Shibuya et al. | |
| 4,511,805 A | 4/1985 | Boy-Marcotte et al. | |
| 5,074,114 A | 12/1991 | Meijer et al. | |
| 5,315,967 A | 5/1994 | Schoell | |
| 5,590,526 A | 1/1997 | Cho | |
| 5,790,420 A | 8/1998 | Lang | |
| 5,826,518 A | 10/1998 | Bhat et al. | |
| 6,167,691 B1 | 1/2001 | Yoshikawa et al. | |
| 6,525,431 B1 | 2/2003 | Clucas et al. | |
| 6,663,752 B2 | 12/2003 | Santilli | |
| 6,729,246 B2 | 5/2004 | Lo | |
| 6,784,562 B2 | 8/2004 | Gennesseaux | |
| 6,994,603 B2 | 2/2006 | Clark et al. | |
| 7,019,412 B2 * | 3/2006 | Ruggieri et al. | 290/2 |
| 7,080,512 B2 | 7/2006 | Schoell | |
| 7,407,382 B2 | 8/2008 | Schoell | |
| 2003/0213246 A1 | 11/2003 | Coll et al. | |
| 2007/0056286 A1 | 3/2007 | Schoell | |
| 2007/0056287 A1 | 3/2007 | Schoell | |
| 2007/0056288 A1 | 3/2007 | Schoell | |
| 2007/0119175 A1 * | 5/2007 | Ruggieri et al. | 60/649 |
| 2007/0240650 A1 | 10/2007 | Schoell | |
| 2007/0256415 A1 | 11/2007 | Schoell | |
| 2007/0256664 A1 | 11/2007 | Schoell | |
| 2007/0261681 A1 | 11/2007 | Schoell | |

(Continued)

FOREIGN PATENT DOCUMENTS

EP  1136542  9/2001

(Continued)

*Primary Examiner* — Jean F Duverne
(74) *Attorney, Agent, or Firm* — Stoneman Law Patent Group; Martin L. Stoneman; Kyle Liudahl

(57) ABSTRACT

An on-site electrical power generation system utilizing environmentally hazardous waste oils as a combustible fuel. The disclosed invention utilizes the combustion of environmentally hazardous waste oils to drive a heat engine and electrical generator. In addition, the system is adapted to provide local space heating and hot water as a byproduct of the combustion process.

25 Claims, 14 Drawing Sheets

U.S. PATENT DOCUMENTS

| | | |
|---|---|---|
| 2008/0047272 A1 | 2/2008 | Schoell |
| 2009/0223479 A1 | 9/2009 | Schoell |
| 2011/0000206 A1* | 1/2011 | Aprad .......................... 60/517 |

FOREIGN PATENT DOCUMENTS

| | | |
|---|---|---|
| WO | WO 99/40309 | 8/1999 |
| WO | WO2006031907 A2 | 3/2006 |
| WO | WO2006031907 A3 | 3/2006 |
| WO | WO2008010969 A2 | 1/2008 |
| WO | WO2008010971 A2 | 1/2008 |
| WO | WO2008010998 A2 | 1/2008 |
| WO | WO2008011036 A2 | 1/2008 |
| WO | WO2008011037 A2 | 1/2008 |
| WO | WO2008011038 A2 | 1/2008 |
| WO | WO2008011040 A2 | 1/2008 |
| WO | WO2008027364 A2 | 3/2008 |
| WO | WO2008027364 A3 | 3/2008 |
| WO | WO2009111043 A2 | 9/2009 |

* cited by examiner

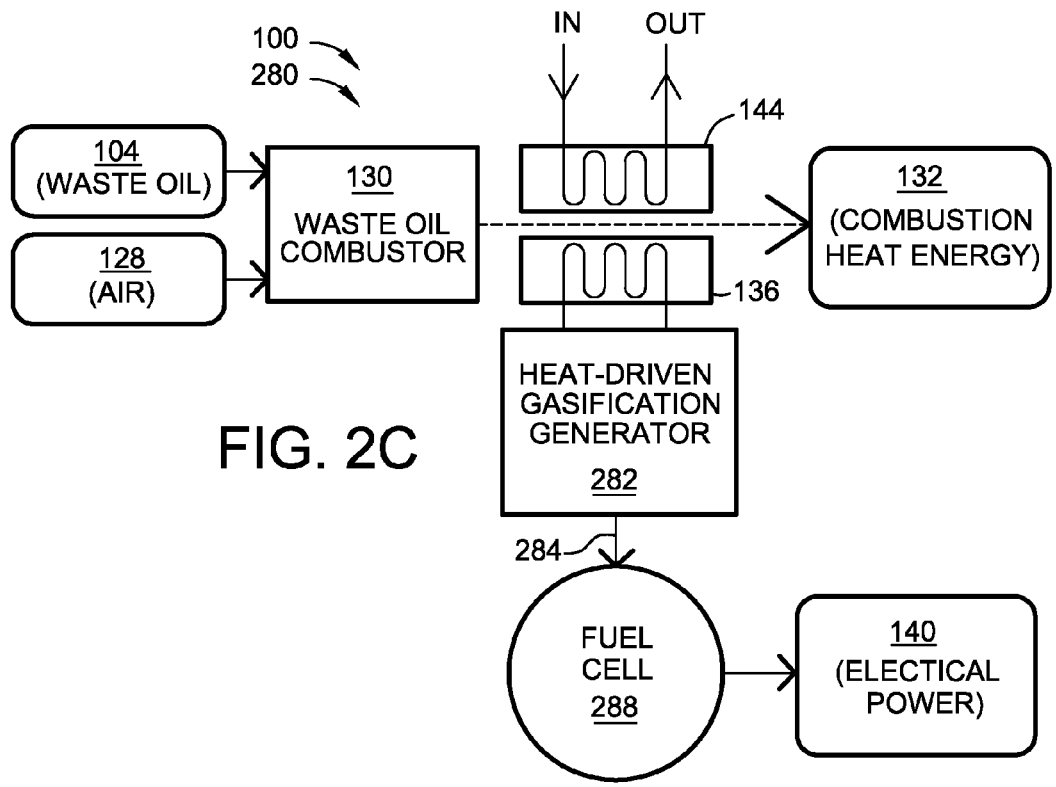
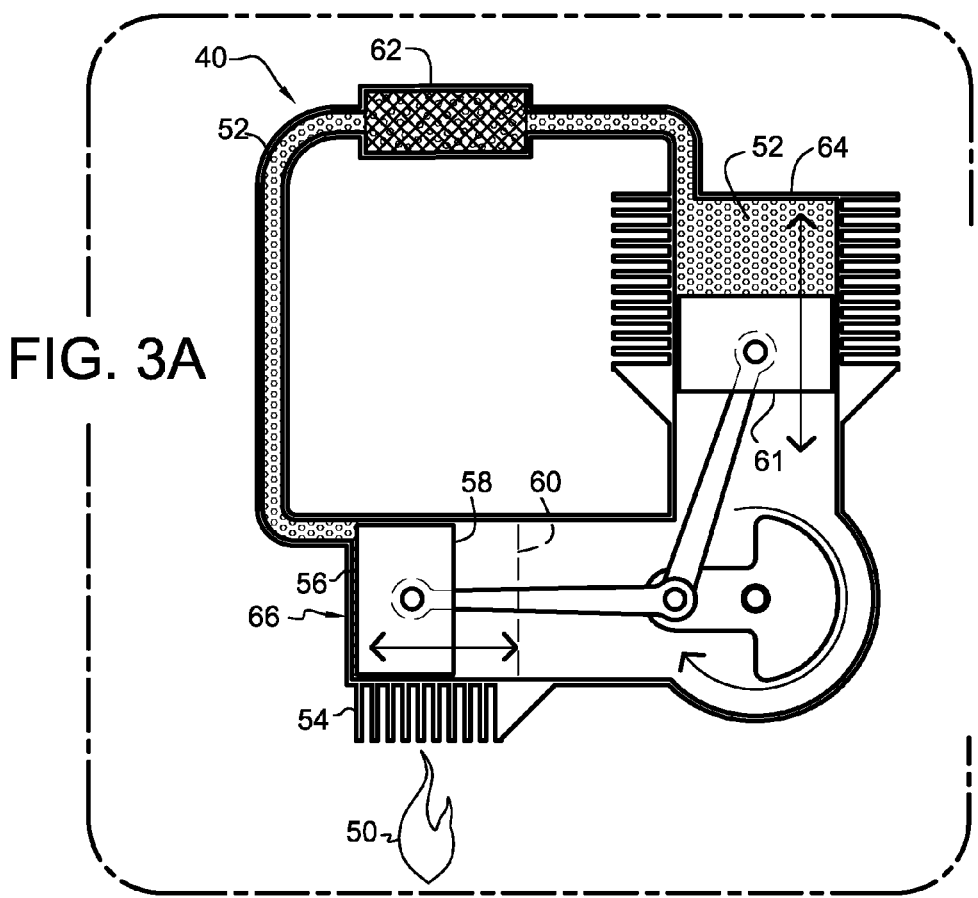

WASTE OIL ELECTRICAL GENERATION SYSTEMS

CROSS-REFERENCE TO RELATED APPLICATION

The present application is related to and claims priority from prior provisional application Ser. No. 61/222,211, filed Jul. 1, 2009, entitled "WASTE OIL ELECTRICAL GENERATION SYSTEMS"; and, this application is related to and claims priority from prior provisional application Ser. No. 61/292,480, filed Jan. 5, 2010, entitled "WASTE OIL ELECTRICAL GENERATION SYSTEMS", the contents of all of which are incorporated herein by this reference and are not admitted to be prior art with respect to the present invention by the mention in this cross-reference section.

BACKGROUND

This invention relates to providing an improved electrical generation system utilizing waste oil as a combustible fuel. More particularly, this invention relates to the co-generation of electrical power using a generator powered by the heat energy produced by a waste-oil-fired furnace.

Well over a billion gallons of used oil are generated in the United States each year. Only a small percent of that amount is properly recycled, with the remainder dumped into the environment. Waste oil dumping has increasingly become a major worldwide environmental issue. It has been shown that one gallon of waste oil can contaminate up to one million gallons of water. Currently, forty percent of the pollution found in the waterways of the United States is created by waste oil, with similar pollution statistics reported by other industrialized countries.

In 1980 the U.S. Congress passed the Used Oil Recycling Act to establish national policy governing used oil. One significant aspect of the legislation was the acceptance of on-site burning of waste oil to produce usable heat. Government leaders recognized that making used oil valuable for hundreds of thousands of small businesses was the best way to prevent dumping and water pollution.

In the United States, the Environmental Protection Agency (EPA) currently acts to establish, monitor and manage waste oil control guidelines in an attempt reduce hazardous environmental waste oil contamination from waste oil dumping. The EPA's rule generally states:
TITLE 40—PROTECTION OF ENVIRONMENT
PART 279—STANDARDS FOR THE MANAGEMENT OF USED OIL—Table of Contents Subpart C—Standards for Used Oil Generators
Sec. 279.23 On-site burning in space heaters. Generators may burn used oil in used oil-fired space heaters provided that:
  (a) The heater burns only used oil that the owner or operator generates or used oil received from household do-it-yourself used oil generators;
  (b) The heater is designed to have a maximum capacity of not more than 0.5 million Btu per hour; and
  (c) The combustion gases from the heater are vented to the ambient air.
[57 FR 41612, Sep. 10, 1992, as amended at 58 FR 26425, May 3, 1993]

Efficient burning of waste oil is a relatively complex problem. Typically, the waste oil being burned is a mixture of several oil types, each having unique physical characteristics (such as varying densities and flow viscosities).

There are a number of manufacturers that have developed waste oil burners. The EPA and CE have approved this type of waste oil burning process without a permit; as long as the EPA's burning criteria are met (as noted above). Despite the high level of efficiency of current waste oil burners, as much as seventy percent of the combustion heat produced by a unit is lost as exhaust. It is clear that a need exists for an improved waste oil burning system that better utilizes valuable generated heat energy currently lost from existing systems.

OBJECTS AND FEATURES OF THE INVENTION

It is a primary object and feature of the present invention to provide an effective, efficient, and legal system for on-site disposal of waste oil. It is another object and feature of the present invention to utilize the heat of such combustion to generate mechanical power. It is another object and feature of the present invention to utilize the mechanical power to generate on-site (local) electrical power. It is a further object and feature of the present invention to provide such a system that incorporates on-site energy conversion apparatus adapted to convert the heat generated by the combustion of such waste oil to mechanical power, and subsequently to such electrical power by means of mechanical generation. It is an additional object and feature of the present invention to utilize an external-combustion heat engine as the heat-to-mechanical power conversion apparatus. It is another object and feature of the present invention to utilize steam as the working fluid in such heat-to-mechanical power conversion apparatus. It is an additional object and feature of the present invention to utilize a heat-to-mechanical power conversion apparatus implementing a Rankine-based power cycle. It is another object and feature of the present invention to provide such a system that utilizes at least one direct heat-to-electrical power conversion process including the use of thermocouple-based electrical power generators and thermophotovoltaic electrical power generators. It is an additional object and feature of the present invention to generate electrical power from the combustion of waste oil through a thermal gasification process driving an electrical fuel cell. It is a further object and feature of the present invention to provide such a system that utilizes the combustion energy of the waste oil to provide space heating. It is another object and feature of the present invention to provide such a system that utilizes the combustion energy of the waste oil to provide a usable hot water source. It is a further object and feature of the present invention to provide such a system that is capable of supplying excess generated electrical power to a larger electrical power grid. It is a further object and feature of the present invention to provide such a system that is capable of storing excess generated electrical power in a battery storage system. It is another object and feature of the present invention to provide such a system that is capable of economically disposing of environmentally-hazardous waste oil. A further primary object and feature of the present invention is to provide such a system that is efficient, inexpensive, and useful. Other objects and features of this invention will become apparent with reference to the following descriptions.

SUMMARY OF THE INVENTION

In accordance with a preferred embodiment hereof, this invention provides a system related to mechanical power generation through the burning of environmentally hazardous waste oils, such system comprising: at least one combustion heater structured and arranged to produce combustion heat through the burning of such environmentally hazardous waste oils; at least one vaporizer structured and arranged to vaporize a working fluid using the combustion heat produced by such at least one combustion heater; at least one thermodynamic energy converter structured and arranged to convert heat extracted from combustion of the vaporized working fluid into at least one output of mechanical work; at least one condenser structured and arranged to condense vaporized working fluid exiting such at least one thermodynamic energy converter; and operably coupled with such at least one condenser, at least one fluid pump to pump condensed working fluid between such at least one condenser and such at least one vaporizer; wherein such at least one combustion heater comprises at least one air intake path, comprising at least one air blower, structured and arranged to deliver at least one combustion airflow to such at least one combustion heater, at least one atomizer structured and arranged to produce an atomized mist of such environmentally hazardous waste oils within the at least one combustion airflow, at least one ignition source to ignite the atomized mist of such environmentally hazardous waste oils within the at least one combustion airflow, and at least one exhaust path to exhaust hot combustion gases from such at least one combustion heater; wherein such at least one air intake path comprises at least one first heat exchanger to preheat the at least one combustion airflow using the latent heat of vaporization extracted from the condensation of the working fluid within such at least one condenser; and wherein such at least one air intake path comprises at least one second heat exchanger to preheat the at least one combustion airflow using heat extracted from the hot combustion gases exhausted through such at least one exhaust path.

Moreover, it provides such a system wherein such at least one exhaust path further comprises at least one waste-heat exchanger structured and arranged to transfer at least one portion of the combustion heat to at least one secondary heatable fluid. Additionally, it provides such a system wherein such at least one waste-heat exchanger is structured and arranged to transfer the combustion heat to air, usable for space heating. Also, it provides such a system wherein the secondary heatable fluid comprises at least one liquid. In addition, it provides such a system further comprising: at least one holder structured and arranged to hold such environmentally hazardous waste oils; and at least one waste-oil transfer component structured and arranged to transfer such environmentally hazardous waste oils from such at least one holder to such at least one combustion heater. And, it provides such a system wherein such at least one waste oil transfer component comprises: at least one waste-oil pre-heater structured and arranged to preheat such environmentally hazardous waste oils prior to burning; wherein such at least one at least one waste-oil pre-heater is further structured and arranged to operate using the combustion heat produced by the burning of such environmentally hazardous waste oils. Further, it provides such a system wherein such at least one thermodynamic energy converter comprises at least one external-combustion heat engine. Even further, it provides such a system wherein such at least one external-combustion heat engine comprises at least one Rankine-cycle heat engine. Moreover, it provides such a system wherein the working fluid is water. Additionally, it provides such a system wherein the working fluid is at least one organic fluid comprising at least one liquid-vapor phase occurring at a lower temperature than that of water at a given pressure. Also, it provides such a system wherein such at least one external-combustion heat engine comprises at least one steam-driven turbine engine.

In addition, it provides such a system wherein such at least one external-combustion heat engine comprises: at least one cylinder; at least one piston reciprocally disposed within such at least one cylinder; at least one crankshaft to translate motion of such at least one piston into rotation; at least one crank disk fitted to such at least one crankshaft and rotatable therewith; at least one connecting rod pivotally connected between such at least one piston and such at least one crank disk; and at least one injector valve, operable between a closed position and at least one open position, to release a pressurized charge of the vaporized working fluid into such at least one cylinder; at least one fluid delivery line to deliver the vaporized working fluid from such at least one combustion heater to such at least one injector valve, wherein motion of such at least one piston is induced by injection of the vaporized working fluid into such at least one cylinder upon momentary opening of such at least one injector valve; and at least one exhaust transfer passage structured and arranged to exhaust the working fluid from such at least one cylinder to such at least one condenser. And, it provides such a system wherein such at least one external-combustion heat engine further comprises: at least one condensate return line to return condensed working fluid from such at least one condenser, to such at least one combustion heater, by the action of such at least one pump; wherein such at least one condensate return line comprises at least one third heat exchanger structured and arranged to heat the condensed working fluid prior to entering such at least one combustion heater; and wherein such at least one third heat exchanger utilizes heat extracted from the vaporized working fluid exhausted from such at least such one cylinder through such at least one exhaust transfer passage. Further, it provides such a system wherein such at least one combustion heater further comprises: in fluid communication with such at least one fluid delivery line and such at least one condensate return line, at least one multi-tube coil comprising a plurality of individual tubes wound in at least one bundle and each of such plurality of tubes being structured and disposed for passage of the working fluid therethrough; situate in a position substantially encircling such at least one multi-tube coil, at least one substantially circular inner wall structured and arranged to control at least one cyclonic circulation of the hot combustion gases adjacent such at least one multi-tube coil; and at least one combustion nozzle assembly structured and arranged to produce the at least one cyclonic circulation of the hot combustion gases adjacent such at least one multi-tube coil; wherein such at least one combustion nozzle assembly comprises such at least one atomizer and such at least one air blower for producing such cyclonic circulation of hot combustion gases.

Even further, it provides such a system further comprising at least one electrical generator structured and arranged to generate electrical power using the mechanical power produced by such at least one external-combustion heat engine. Moreover, it provides such a system further comprising at least one electrical network electrically coupled to such at least one electrical generator and at least one on-site load. Additionally, it provides such a system further comprising: at least one power controller structured and arranged to control the output of the electrical power of such at least one electrical generator to such at least one electrical network; wherein such at least one power controller comprises at least one engine control structured and arranged to control levels of mechanical power output by such at least one external-combustion heat engine. Also, it provides such a system wherein such at least one electrical network further comprises: at least one electrical storage device structured and arranged to store the electrical power within at such at least one electrical network; and at least one electrical-controller structured and arranged to control the transfer of the electrical power between such at least one electrical storage device and such at least one on-site load. In addition, it provides such a system wherein such at least one electrical network further comprises at least one connection to at least one larger electrical grid.

In accordance with another preferred embodiment hereof, this invention provides a system related to on-site burning of on-site-generated waste oils for the purpose of on-site electrical power generation, such system comprising: at least one holder structured and arranged to hold such on-site-generated waste oils; at least one combustion heater structured and arranged to produce combustion heat by burning such on-site-generated waste oils; at least one waste oil transfer component structured and arranged to transfer such on-site-generated waste oils from at least one holder to such at least one combustion heater; and operably coupled to such at least one combustion heater, at least one heat-energy converter structured and arranged to convert such combustion heat to electrical power; wherein such at least one heat energy converter comprises at least one Rankine-cycle external-combustion heat engine structured and arranged to convert such combustion heat to mechanical power, and operationally coupled to such at least one Rankine-cycle external-combustion heat engine, at least one electrical generator adapted to the generate electrical power; wherein such at least one holder comprises at least one collector structured and arranged to assist in on-site collecting of such on-site-generated waste oils; wherein such at least one waste oil transfer component comprises at least one waste-oil pump to pump such on-site-generated waste oils from such at least one holder to such at least one combustion heater; wherein such at least one combustion heater comprises: at least one atomizer structured and arranged to atomize such on-site-generated waste oils prior to combustion; and at least one igniter adapted to ignite such on-site-generated waste oils after such on-site-generated waste oils have passed through such at least one atomizer. And, it provides such a system further comprising at least one waste-heat exchanger structured and arranged to transfer at least one portion of the combustion heat to at least one secondary heatable fluid.

Further, it provides such a system further comprising at least one on-site electrical circuit adapted to utilize the electrical power. Even further, it provides such a system wherein such at least one electrical network comprises at least one electrical controller structured and arranged to control electrical power within such at least one electrical network. Even further, it provides such a system wherein: such at least one electrical network further comprises at least one electrical storage device structured and arranged to store electrical power; and such at least one electrical controller is structured and arranged to control at least one transfer of electrical power between such at least one electrical storage device and such at least one electrical network. Even further, it provides such a system wherein such at least one electrical controller is structured and arranged to control transfers of electrical power between such at least one electrical network and at least one larger electrical grid.

In accordance with another preferred embodiment hereof, this invention provides a method, related to on-site burning of on-site-generated environmentally hazardous waste oils for the purpose of on-site electrical power generation comprising the steps of: establishing at least one on-site process to generate such on-site-generated environmentally hazardous waste oils; collecting such on-site-generated environmentally hazardous waste oils; producing combustion heat by burning such environmentally hazardous waste oils in at least one on-site combustion heater; converting such combustion heat to mechanical power using at least one Rankine-cycle external-combustion heat engine structured and arranged to convert such combustion heat to mechanical power; producing on-site electrical power by coupling the mechanical power output of such at least one Rankine-cycle external-combustion heat engine to at least one electrical generator structured and arranged to generate electrical power using the mechanical power produced by such at least one Rankine-cycle external-combustion heat engine; wherein such at least one Rankine-cycle external-combustion heat engine comprises such at least one on-site combustion heater; wherein such at least one on-site combustion heater comprises at least one air intake path, comprising at least one air blower, structured and arranged to deliver at least one combustion airflow to such at least one combustion heater, at least one atomizer structured and arranged to produce an atomized mist of such environmentally hazardous waste oils within the at least one combustion airflow, at least one ignition source to ignite the atomized mist of such environmentally hazardous waste oils within the at least one combustion airflow, at least one exhaust path to exhaust hot combustion gases from such at least one combustion heater, and at least one vaporizer structured and arranged to vaporize a working fluid using the combustion heat produced by such at least one combustion heater; wherein such at least one Rankine-cycle external-combustion heat engine further comprises at least one condenser structured and arranged to condense vaporized working fluid exiting such at least one on-site combustion heater, and operably coupled with such at least one condenser, at least one fluid pump to pump condensed working fluid between such at least one condenser and such at least one vaporizer; wherein such at least one air intake path comprises at least one first heat exchanger to preheat the at least one combustion airflow using the latent heat of vaporization extracted from the condensation of the working fluid within such at least one condenser; and wherein such at least one air intake path comprises at least one second heat exchanger to preheat the at least one combustion airflow using heat extracted from the hot combustion gases exhausted through such at least one exhaust path.

Even further, it provides such a method further comprising the steps of: establishing at least one connection to at least one larger electrical grid; and selling at least one portion of such on-site electrical power by way of such at least one larger electrical grid. Even further, it provides such a method further comprising the step of using such combustion heat for on-site heating uses. Even further, it provides such a method further comprising the step of using such electrical power for at least one on-site electrical use. Even further, it provides such a method further comprising the steps of: providing at least one on-site electrical storage device structured and arranged to store at least one portion of such electrical power; and storing at least one portion of such electrical power within such at least one on-site electrical storage device. Even further, it provides such a method further comprising the initial step of collecting such environmentally hazardous waste oils from at least one off-site, non-commercial, waste oil source. Even further, it provides such a method wherein such at least one on-site process comprises the step of performing at least one on-site maintenance service on at least one transportation vehicle to generate such on-site-generated environmentally hazardous waste oils. Even further, it provides each and every novel feature, element, combination, step and/or method disclosed or suggested by this patent application.

BRIEF DESCRIPTION OF THE DRAWINGS

FIG. 2C is a diagrammatic illustration of the principal components of a waste oil cogeneration system based on a heat-driven gasification generator coupled to a electrical power generating fuel cell according to a preferred embodiment of the present invention.

FIG. 3A is a diagrammatic sectional view, illustrating in general, the operational principles of a typical Stirling-cycle system.

DETAILED DESCRIPTION OF THE BEST MODES AND PREFERRED EMBODIMENTS OF THE INVENTION

Figure 1:
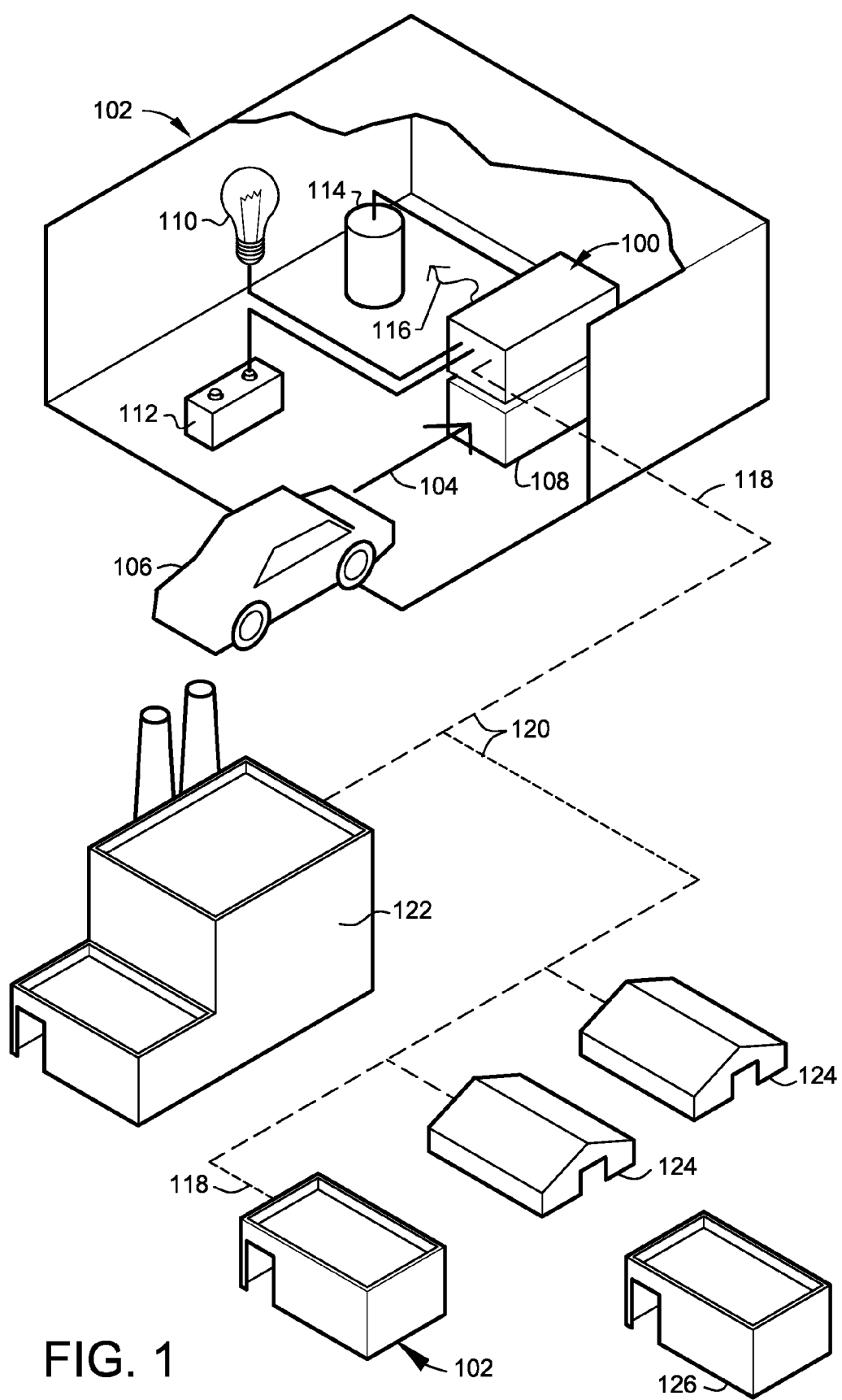
FIG. 1 is a diagrammatic perspective view, illustrating in general, a typical organization of waste oil distributed cogeneration sites linked to a larger electrical power grid, as well as remote waste oil electrical generation sites independent from a larger power distribution system, according to a preferred embodiment of the present invention.

FIG. 1 is a diagrammatic perspective view, illustrating in general, a typical organization of distributed cogeneration site(s) 102 linked to a larger electrical power grid 120, as well as remote waste oil electrical cogeneration site(s) 126, independent from a larger power distribution system, according to a preferred embodiment of the present invention.

The enlarged cut-away view of distributed cogeneration site 102 (in the upper portion of FIG. 1) illustrates, in general, the preferred operational and mechanical arrangements that make up a distributed cogeneration site utilizing waste oil generated on-site as a source of useable energy. In the present disclosure the term "on-site" shall include in the definition the taking place or located at a site comprising waste oil cogeneration system 100.

Preferably, a significant portion of the on-site electrical power 110 used within the local electrical network of distributed cogeneration site 102 (at least embodying herein at least one electrical network structured and arranged to utilize electrical power) is produced by waste oil cogeneration system 100, as shown. Waste oil cogeneration system 100 is especially well-suited for use within sites that regularly generate waste oil, such as motor vehicle service shops, fleet maintenance facilities, "quick-lube" shops, and other operations that service, repair or dispose of materials that contain quantities of synthetic or refined crude oil (at least embodying herein at least one power producing site having at least one such electrical circuit, and at least one on-site process to generate such on-site-generated environmentally hazardous waste oils and further at least embodying herein wherein such at least one on-site process comprises the step of performing at least one on-site maintenance service on at least one transportation vehicle to generate such on-site-generated environmentally hazardous waste oil). Under appropriate circumstances, a distributed cogeneration site may collect waste from external, non-commercial sources, such as individuals undertaking "do-it-yourself" vehicle maintenance (at least embodying herein wherein the at least one on-site process comprises collection of the waste oil from at least one non-commercial source).

For the purpose of illustration within the present disclosure, distributed cogeneration site 102 of FIG. 2 produces waste oil through the service and maintenance of transportation vehicles such as motor vehicle 106, as shown. Waste oil 104 collected from the on-site service and maintenance of motor vehicle 106 is preferably transferred to a waste oil collection tank 108 (at least embodying herein at least one holder structured and arranged to hold on-site-generated environmentally hazardous waste oils produced by the at least one on-site process), preferably incorporated within waste oil cogeneration system 100, as shown. Preferably, waste oil 104 is burned, in controlled manner, within waste oil cogeneration system 100 to produce usable heat energy.

Preferably, the term "cogeneration" refers to the simultaneous production of on-site electrical power 110 and usable heat. In a preferred embodiment of the present invention, waste oil cogeneration system 100 is configured as a multi-generation unit, producing electrical power, hot air 116 (for space-heating) and hot water 114 (at least embodying herein wherein such at least one secondary heat exchanger is structured and arranged to transfer heat to air, usable for space heating; and wherein the heatable fluid comprises at least one liquid), as shown.

Distributed cogeneration site 102 may preferably include an energy storage system 112 to permit added flexibility in the timing and frequency of external electrical power purchases and increased reliability to the overall electrical supply features of the system. To control initial implementation and long-term maintenance costs, energy storage system 112 preferably comprises a conventional battery storage system, as shown (at least embodying herein wherein such at least one electrical network further comprises at least one electrical storage device structured and arranged to store electrical power). Upon reading this specification, those with ordinary skill in the art will understand that, under appropriate circumstances, such as commercial availability, user preference, advances in technology, etc., other storage systems, such as, for example, super capacitors, Superconducting Magnetic Energy Storage (SMES) systems, flywheels and Compressed Air Energy Storage (CAES) systems, may suffice.

Preferably, distributed cogeneration site(s) 102 located near or within an external electrical power distribution system, such as larger electrical power grid 120, include at least one electrical grid connection 118 (at least embodying herein wherein such at least one on-site electrical circuit comprises at least one electrical network connected to at least one larger electrical grid), as shown. Preferably, distributed cogeneration site 102 supplies any excess electrical power generated by waste oil cogeneration system 100 to larger electrical power grid 120, via electrical grid connection 118, as shown. Similarly, electrical grid connection 118 allows distributed cogeneration site 102 to draw electrical power from central generating plant 122, via larger electrical power grid 120, in circumstances where the overall power demand of distributed cogeneration site 102 exceeds the generation capacity of waste oil cogeneration system 100. The term "distributed cogeneration", as described within the present disclosure, refers to a decentralization of electrical power generation from traditional large "utility" scale generation sites (such as central generating plant 122) to a combination of conventional large scale generation sites functioning in conjunction with a "near-demand" distribution of smaller, "on-site" electrical generators, as shown. While central generating plant 122 continues to provide most of the power to larger electrical power grid 120, the distributed cogeneration site(s) 102 are, under appropriate circumstances, able to supply power to other local power users during times of peak demand, as shown.

In another highly-preferred application of the present invention, waste oil cogeneration system 100 is used to supply electrical power and usable heat energy to remote waste oil electrical cogeneration site 126, as shown. Waste oil electrical cogeneration site 126 is located such that connection to larger electrical power grid 120 is impossible or otherwise geographically or economically impractical. In the case of remote waste oil electrical cogeneration site 126, waste oil cogeneration system 100 preferably supplies all electrical power and at least some mechanical heating to the site.

Thus, in accordance with preferred embodiments of the present invention, there is provided, related to on-site burning of on-site-generated environmentally hazardous waste oils for the purpose of on-site electrical power generation, a method comprising the preferred steps of: establishing at least one on-site process to generate such on-site-generated environmentally hazardous waste oils; collecting such on-site-generated environmentally hazardous waste oils; producing combustion heat by burning such environmentally hazardous waste oils in at least one on-site combustion heater; and producing on-site electrical power by converting such combustion heat to electrical power. And further comprising the steps of: establishing at least one connection to at least one larger electrical grid; and selling at least one portion of such on-site electrical power by way of such at least one larger electrical grid. Even further, it provides such a method comprising the step of using such combustion heat for on-site heating uses. Even further, it provides such a method further comprising the step of using such electrical power for at least one on-site electrical use. Furthermore, it provides such a method comprising the steps of: providing at least one on-site electrical storage device structured and arranged to store at least one portion of such electrical power; and storing at least one portion of such electrical power within such at least one on-site electrical storage device. Even further, it provides such a method comprising the initial step of collecting such environmentally hazardous waste oils from at least one off-site, non-commercial, waste oil source. And, it provides such a method wherein such at least one on-site process comprises the step of performing at least one on-site maintenance service on at least one transportation vehicle to generate such on-site-generated environmentally hazardous waste oils.

Figure 2A:
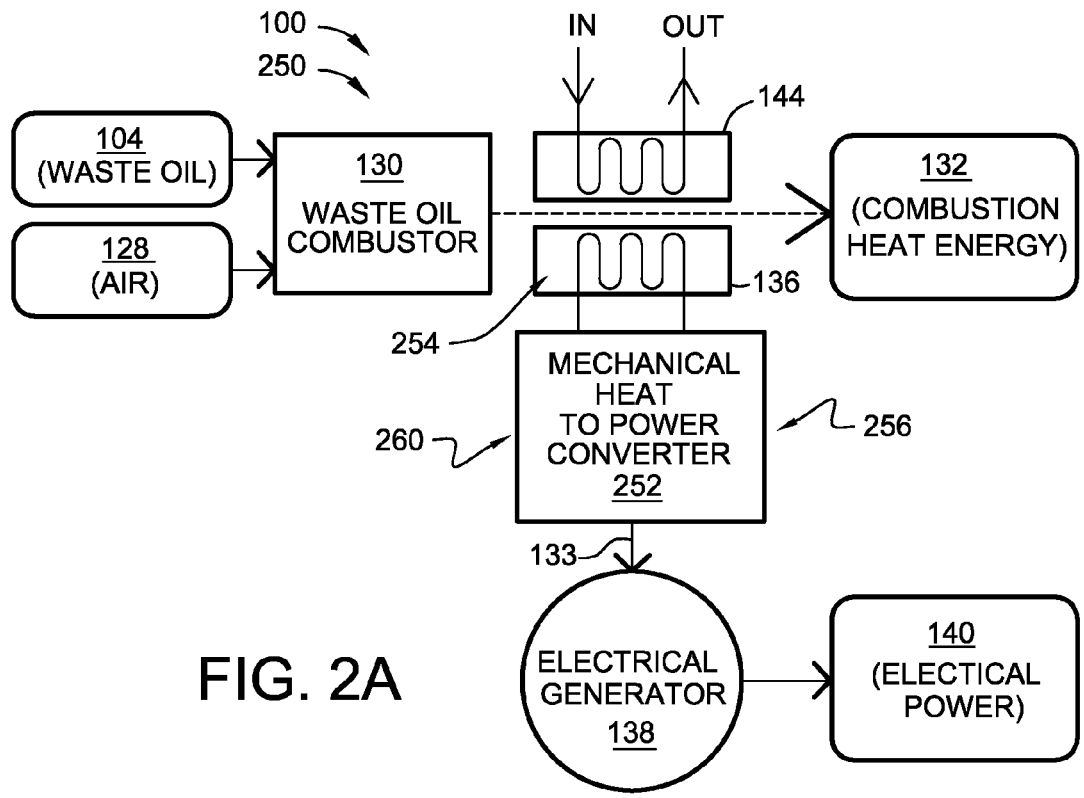
FIG. 2A is a diagrammatic illustration of the principal components of a waste oil cogeneration system based on a heat-to-mechanical power converter according to a preferred embodiment of the present invention.

FIG. 2A is a diagrammatic illustration of the principal components of waste oil co-generator 250 of waste oil cogeneration system 100 based on heat-to-mechanical power converter 252 in combination with electrical generator 138 according to a preferred embodiment of the present invention. Preferably, waste oil co-generator 250 contains at least one waste oil combustor 130 (at least embodying herein at least one combustion heater structured and arranged to produce combustion heat by burning such on-site-generated environmentally hazardous waste oils) that combines waste oil 104 with a moving airstream (preferably compressed air 128) to form a highly combustible atomized air/fuel mixture. Igniting the atomized mixture of waste oil 104 and compressed air 128 generates combustion heat energy 132, as shown.

A primary function of waste oil electrical cogeneration system 100 is the conversion of combustion heat energy 132 into electrical power 140, as shown. The conversion of combustion heat energy 132 into electrical power by waste oil co-generator 250 (at least embodying herein at least one heat energy converter structured and arranged to convert such combustion heat to electrical power) is accomplished through a multi-step process. Preferably, working fluid heat exchanger 136 (at least embodying herein at least one primary heat exchanger structured and arranged to transfer such combustion heat to such at least one heat energy converter) is brought into thermal relationship with combustion heat energy 132 (at least embodying herein at least one primary heat exchanger structured and arranged to transfer such combustion heat), enabling the transfer of heat from combustion heat energy 132 to heat-to-mechanical power converter 252, as shown. Preferably, heat-to-mechanical power converter 252 is arranged to convert the heat transferred by working fluid heat exchanger 136 into mechanical energy 133 (e.g., torque within a rotating output shaft), as shown. Preferably, heat-to-mechanical power converter 252 is operationally coupled to electrical generator 138, which then converts mechanical energy 133 into electrical power 140.

As previously described, waste oil electrical cogeneration system 100 is preferably a cogeneration (or multi-generation) unit wherein waste heat energy is extracted from the system.

In the example of FIG. 2A, waste-heat exchanger 144 (at least embodying herein at least one waste-heat heat exchanger structured and arranged to transfer at least one portion of the combustion heat to at least one heatable fluid; wherein such at least one waste-heat heat exchanger is structured and arranged to transfer heat to air, usable for space heating; and wherein the heatable fluid comprises at least one liquid) is brought into thermal relationship with combustion heat energy 132, drawing usable heat from combustion heat energy 132, as shown.

Preferably, heat-to-mechanical power converter 252 (at least embodying herein at least one heat energy converter structured and arranged to convert such combustion heat to electrical power) comprises at least one commercially available heat-to-mechanical power conversion device, such as, for example, a steam turbine, hydrocarbon vapor turbine, or Stirling-cycle engine. Upon reading the teachings of this specification, those of ordinary skill in the art will now understand that, under appropriate circumstances, considering such issues as intended use, advances in technology, etc., other heat-to-mechanical energy conversion prime movers, such as, for example, gas turbines operating by direct interaction with the combustion stream, use of Tesla-type disk turbines, engines utilizing alternate thermal fluids such as helium, etc., may suffice.

Steam driven embodiments of the present invention (embodiments of heat-to-mechanical power converter 252 incorporating one or more steam turbines as the prime mover driving electrical generator 138), preferably comprise a functional combination of one or more commercially available steam generators 254 adapted to supply steam to one or more commercially available steam turbines 256, as shown. Preferably, combustion heat energy 132 is transferred from steam generators 254 of working fluid heat exchanger 136 to steam turbines 256 through high-pressure steam that in turn powers steam turbines 256 coupled to electrical generator 138, as shown.

Preferably, working fluid heat exchanger 136 comprises steam generator 254, as shown. Preferably, steam generator 254 comprises a heating coil-type boiler, preferably utilizing a water-tube boiler arrangement with forced circulation. Such heating coil boilers preferably comprise a spirally wound construction of steel tubes similar in structure and arrangement to the boiler embodiment of FIG. 9. Preferably, the heating coil boiler system comprises all accessory apparatus (as required by the supplier/manufacturer) necessary to provide a complete and operable system. Upon reading the teachings of this specification, those of ordinary skill in the art will now understand that, under appropriate circumstances, considering such issues as intended use, boiler design, etc., the utilization of additional functional components, such as, for example, feedwater tanks, condensers, feedwater pumps, separators/accumulators, control valves, pressure bypass circuits, temperature monitors, etc., may suffice. Preferably, steam generators adaptable for use within working fluid heat exchanger 136 include commercially available systems produced by Clayton Industries of El Monte, Calif., U.S.A. (website URL: www.claytonindustries.com).

The thermodynamic cycle for steam turbine 256 is the Rankine cycle. Preferably, in the steam cycle, water is first pumped to medium to high pressure. It is then heated by steam generator 254 of working fluid heat exchanger 136 to the boiling temperature, and is most preferably superheated (heated to a temperature above that of boiling). Preferably, steam turbine 256 expands the pressurized steam to lower pressure and the steam is then exhausted to a condenser. The condensate from the condenser returns to a feedwater pump for continuation of the cycle. Preferably, steam turbine 256 comprises a set of stationary blades (nozzles) and a moving set of adjacent blades (rotor blades) situate within a sealed casing. The two sets of blades cooperate such that the steam turns the shaft of the turbine and the connected load (electrical generator 138), as shown.

Preferably, a wide array of commercially available turbine designs are adaptable for use as steam turbine 256, with a single stage, single casing design being preferred for reliability and cost. Preferably, steam turbine 256 comprises an output of about 160 HP, a maximum speed of about 3,600 RPM, an inlet input of up to 650 PSIG, 775° F., and exhaust output of up to about 101 psig. Preferably, steam turbines adaptable for use as steam turbine 256 include small format GLT turbines produced by the Dresser-Rand Company of Olean, N.Y.

Other preferred embodiments of heat-to-mechanical power converter 252 preferably comprise systems incorporating one or more vaporized hydrocarbon turbines 260 adapted to utilize vaporized hydrocarbon, rather than steam, to generate mechanical power. Such systems preferably utilize a pressurized light hydrocarbon medium with propane and propylene being most preferred. The advantage of vaporized hydrocarbon systems over steam systems is the lower operational combustion temperatures required to vaporize the above-mentioned hydrocarbon compounds. This has a distinct and sometimes preferred advantage in enabling embodiments of heat-to-mechanical power converter 252 where restricted combustion temperatures are desired or mandated by law. Preferably, working fluid heat exchanger 136 (at least embodying herein at least one primary heat exchanger structured and arranged to transfer such combustion heat to such at least one heat energy converter) is adapted to vaporize a light hydrocarbon liquid to produce a pressurized vapor circuited to vaporized hydrocarbon turbine 260, as shown. The system preferably comprises a hermetic process comprising a closed loop cycle. It is noted that the configuration and operation of such vaporized hydrocarbon turbine devices are described in greater detail in, for example, U.S. Pat. No. 6,857,268 to Stinger et al., incorporated herein by reference for further examples of implementation engineering. Commercially available vaporized hydrocarbon turbines suitable for adaptation and use as vaporized hydrocarbon turbine 260 are produced by WOW Energy, Inc. of Houston, Tex.

Figure 2B:
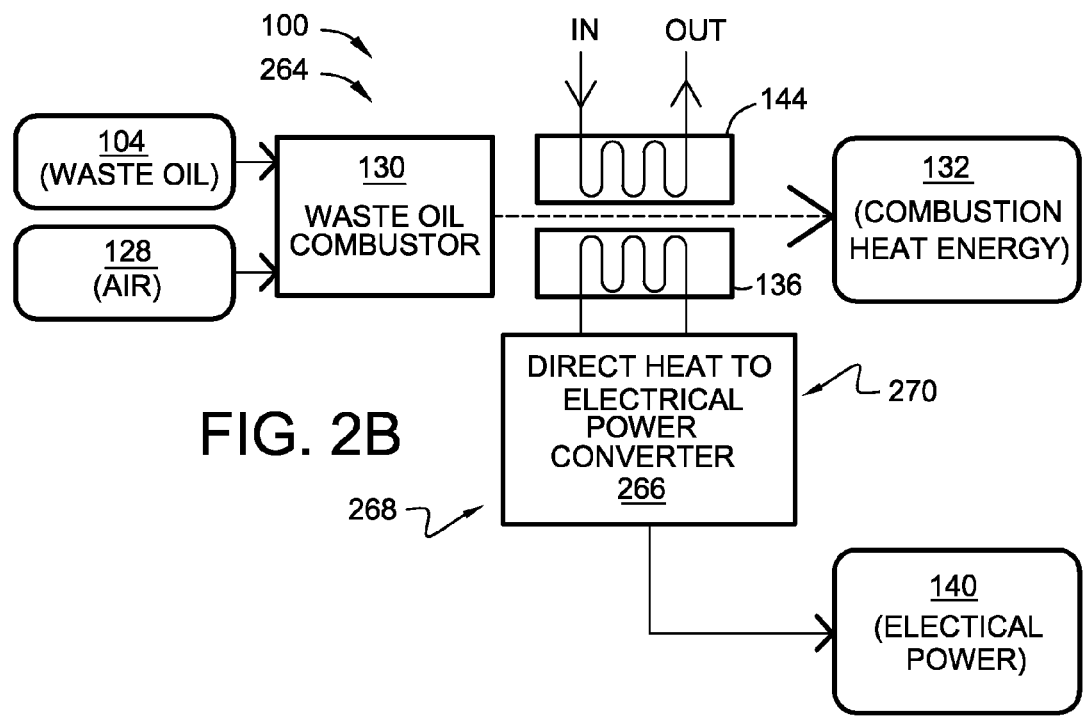
FIG. 2B is a diagrammatic illustration of the principal components of a waste oil cogeneration system based on a direct heat-to-electrical power converter according to a preferred embodiment of the present invention.

FIG. 2B is a diagrammatic illustration of the principal components of an alternate waste oil co-generator 264 (at least embodying herein at least one heat energy converter structured and arranged to convert such combustion heat to electrical power) of waste oil cogeneration system 100 based on direct heat-to-electrical power converter 266 according to a preferred embodiment of the present invention. Preferably, direct heat-to-electrical power converter 266 omits the mechanical conversion and electrical generation steps of FIG. 2A by converting combustion heat energy 132 substantially directly to electrical energy. Preferably, waste oil co-generator 264 contains at least one waste oil combustor 130 (at least embodying herein at least one combustion heater structured and arranged to produce combustion heat by burning such on-site-generated environmentally hazardous waste oils) that combines waste oil 104 with compressed air 128 to form a highly combustible atomized air/fuel mixture. Igniting the atomized mixture of waste oil 104 and compressed air 128 generates combustion heat energy 132, as shown.

Preferably, direct heat-to-electrical power converter 266 comprises at least one direct heat-to-electrical power device, such as, for example, thermocouple-based electrical power generators and thermophotovoltaic electrical power generators. Upon reading the teachings of this specification, those of ordinary skill in the art will now understand that, under appropriate circumstances, considering such issues as cost, advances in technology, etc., other direct electrical generation arrangements, such as, for example, thermionic conversion, pyroelectric conversion, magnetohydrodynamic conversion, electrogasdynamic conversion, etc., may suffice.

Preferred embodiments of direct heat-to-electrical power converter 266 comprising thermocouple-based electrical power generator 268 preferably utilize the Seebeck effect to generate electrical power from combustion heat energy 132. This preferably involves utilizing the properties of a thermocouple, which comprise two electrical conductors of different materials joined at both ends. If the junctions are maintained at different temperatures, an electric current is generated and flows through the conductors. By coupling a large number of thermocouples in series, most preferably thermocouples of a semi-conductor-type, electrical power 140 (comprising a sizeable current) can be generated. It is noted that the configuration and operation of such thermocouple-based electrical power generator devices are described in greater detail in, for example, U.S. Pat. No. 4,734,139 to Shakun et al., incorporated herein by reference for further examples of implementation engineering. Preferably, working fluid heat exchanger 136 (at least embodying herein at least one primary heat exchanger structured and arranged to transfer such combustion heat to such at least one heat energy converter) comprises a plurality of heat absorbing fins adapted to collect combustion heat energy 132 used to drive the generation of electrical power 140 by thermocouple-based electrical power generator.

Preferred embodiments of direct heat-to-electrical power converter 266 comprise thermophotovoltaic electrical power generator 270 adapted to use the thermal radiation from combustion heat energy 132 to generate electrical power 140. Preferably, working fluid heat exchanger 136 (at least embodying herein at least one primary heat exchanger structured and arranged to transfer such combustion heat to such at least one heat energy converter) comprises a plurality of self-contained thermophotovoltaic (TPV) vessels encapsulating photocells responsive at infrared wavelengths. These heat responsive photocells generate electrical power 140, as shown. Thermophotovoltaic electrical power generators 270 have been successfully used in regenerative sideport glass tank melting furnaces in industrial glass production, and are readily adaptable to function within direct heat-to-electrical power converter 266. It is noted that the configuration and operation of such thermophotovoltaic electrical power generator devices are described in greater detail in, for example, U.S. Pat. No. 6,538,193 to Fraas, incorporated herein by reference for further examples of implementation engineering.

FIG. 2C is a diagrammatic illustration of the principal components of waste oil co-generator 280 (at least embodying herein at least one heat energy converter structured and arranged to convert such combustion heat to electrical power) of waste oil cogeneration system 100 based on heat-driven gasification generator 282 coupled to an electrical power generating fuel cell 288 according to a preferred embodiment of the present invention. Preferably, waste oil co-generator 280 is adapted to gasify an input of waste oil 104 utilizing combustion heat energy 132 conducted to heat-driven gasification generator 282 by working fluid heat exchanger 136 (at least embodying herein at least one primary heat exchanger structured and arranged to transfer such combustion heat to such at least one heat energy converter), as shown. Preferably, heat-driven gasification generator 282 operates within a preferred "low-temperature" range of between about 700 and 1800 degrees Fahrenheit. Preferably, such gasification of waste oil 104 results in the production of raw gas products that are introduced into a fuel reforming process adapted to produce fuel gas 284 that is generated by decomposition of high-molecular hydrocarbons contained within the raw gas products. Preferred fuel reforming processes include the reaction of the raw gas products with Ni—Mo-base or Co—Mo-base catalysts to accelerate reduction in molecular weight of hydrocarbons. In addition, preferred fuel reforming processes include in injection of hydrogen and oxygen (in the form of steam) to further facilitate the reaction process.

Preferably, fuel gas 284, substantially comprising a mixture of hydrogen and carbon dioxide, is supplied to fuel cell 288, as shown. Most preferably, working fluid heat exchanger 136, the fuel reforming process, and fuel cell 288 are integrated to simplify the configuration of the overall apparatus and to improve efficiency. This preferred arrangement enables heat produced by waste oil combustor 130 and fuel cell 288 to be effectively used in the fuel reforming process. It is noted that the configuration and operation of such heat-driven gasification generators coupled to electrical power generating fuel cells are described in greater detail in, for example, European Patent Application No. EP 1 136 542 to Fujimura et al., incorporated herein by reference for further examples of implementation engineering.

Upon reading the teachings of FIG. 2A through FIG. 2C, those of ordinary skill in the art will now understand that, waste oil cogeneration system 100 is adaptable to comprise a functional range of closely related preferred embodiment, specifically preferred embodiments utilizing the combustion of hazardous waste to produce electrical power. Based on factors that include present economics, commercial availability of essential system components, current state of existing technology, etc., it is most preferred that waste oil cogeneration system 100 be based on the mechanical heat-to-power embodiment of FIG. 2A. More specifically, it is currently most preferred that waste oil cogeneration system 100 comprise a Stirling-cycle device to convert the combustion heat energy 132 to mechanical energy 133 used to drive electrical generator 138. The remainder of the present disclosure is focused on enabling embodiments of the present invention incorporating Stirling-cycle devices as the prime mover driving electrical generator 138.

Stirling-cycle engines were originally patented in 1816 and were commonly used prior to World War I. Stirling-cycle technology quickly became a popular alternative to steam engines due, in part, to a better operational safety record (early Stirling engines commonly used air as the working fluid). As steam engine technology improved, the Stirling engine eventually lost favor. Recent interest in distributed energy generation has revived interest in Stirling engines and, as a result, research and development efforts have increased.

The theoretical and practical design of the Stirling-cycle engine is known in the art, and therefore, will not be discussed at length within this disclosure. It is noted that the design and operation of such Stirling-cycle devices is described in greater detail in, for example, the dissertation entitled, "*Stirling Cycle Engine Analysis*", by Dr. Israel Urieli of Ohio University (1884), incorporated herein by reference as prior art enabling, in conjunction with this specification, the below described Stirling-cycle engines Stirling engines are classed as external combustion engines, comprising a sealed system utilizing an inert internal working fluid (typically a gas, such as helium), in conjunction with an external heat source and heat exchanger. Stirling-cycle engines take advantage of the relationship between heat, volume, and pressure of a gas to produce mechanical power.

Referring now to FIG. 3A, in typical Stirling-cycle engine 40, heat 50 is transferred to working gas 52 through heat exchanger 54. Pressure of working gas 52 rises with the increased gas temperature as working gas 52 is held within the fixed volume of sealed cylinder 56. This increase in the pressure of working gas 52 pushes piston 58 to perform mechanical work. As piston 58 reaches a position of maximum cylinder volume 60, mechanical displacement mechanism 61 moves working gas 52 from the above-described "hot" portion of the engine 66 through "regenerator" 62 to a "cool" portion of the engine 64. In moving through regenerator 62, heat from working gas 52 is temporarily stored. Mechanical displacement mechanism 61 continues to move the cooled working gas 52 through the cycle in such a way as to move and compress cooled working gas 52 back to hot portion of the engine 66 through regenerator 62 (where it picks up the heat left behind within the regenerator matrix). Working gas 52 is further heated in heat exchanger 54 and the cycle begins again. Currently, no Stirling-cycle engine operates on the combustion heat produced by the burning of hazardous waste oil or through the utilization of hazardous waste oil produced through one or more on-site processes.

It is clear from the above discussions that an effective, efficient combination of a Stirling-cycle engine and waste oil burner would be of great economic and environmental benefit. With such combination, a significant portion of the "waste heat" lost in existing waste oil burner designs can be effectively recovered by a Stirling-cycle engine, thereby greatly increasing the overall energy efficiency of the combined system.

It has been determined that waste oil possesses nearly twice the energy value of coal, and more energy than #2 fuel oil. It should be noted that the term "environmentally hazardous waste oils", as used within this specification and the below claims, shall include within the definition those oils classified by the governing agencies as "recyclable" for energy recovery through burning. The applicant has estimated that using such combined used-oil-fired Stirling-cycle engine, one gallon of used oil can generate up to 18-kilowatt hours of electricity.

Operators of an on-site waste-oil-fired electrical generation system may find further economic benefits by selling surplus power back to an electrical utility, via an avoided rate, or net metering program. Additionally, off-grid operators of an on-site waste-oil-fired electrical generation system will benefit from a convenient, packaged source of electrical power, space heat and hot water. Thus it is therefore a further object and feature of the present invention to provide such a system that converts the combustion energy of waste oil into mechanical energy by use of a Stirling-cycle engine. Thus, it is an additional object and feature of the present invention to provide such a system that utilizes the mechanical output of the Stirling-cycle engine to drive an electrical generator.

Figure 3B:
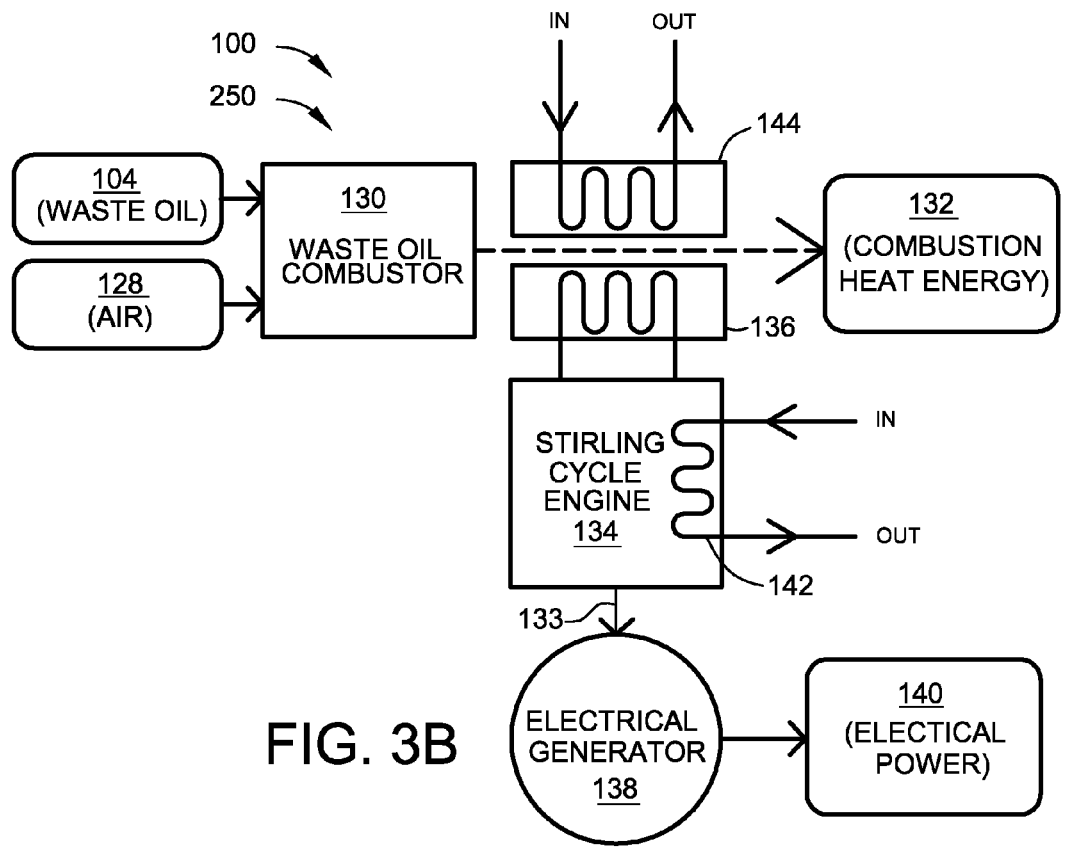
FIG. 3B is a diagrammatic illustration of the principal components of a waste oil cogeneration system based on a heat-to-mechanical power converter comprising a Stirling engine, according to the preferred embodiment of FIG. 2A.

FIG. 3B is a diagrammatic illustration of the principal components of waste oil co-generator 250 of waste oil cogeneration system 100, according to the preferred embodiment of FIG. 2A. Preferably, waste oil co-generator 250 contains at least one waste oil combustor 130 (at least embodying herein at least one combustion heater structured and arranged to produce combustion heat by burning such on-site-generated environmentally hazardous waste oils) that combines waste oil 104 with compressed air 128 to form a highly combustible atomized air/fuel mixture. Igniting the atomized mixture of waste oil 104 and compressed air 128 generates combustion heat energy 132, as shown.

A primary function of waste oil electrical cogeneration system 100 is the conversion of combustion heat energy 132 into electrical power 140, as shown. The conversion of combustion heat energy 132 into electrical power is accomplished through a basic multi-step process. Preferably, working fluid heat exchanger 136 (at least embodying herein at least one primary heat exchanger structured and arranged to transfer such combustion heat to such at least one heat energy converter) is brought into thermal relationship with combustion heat energy 132 (at least embodying herein at least one primary heat exchanger structured and arranged to transfer such combustion heat to such at least one heat energy converter), initiating the transfer of heat from combustion heat energy 132 to Stirling-cycle engine 134, as shown. Preferably, Stirling-cycle engine 134 is arranged to convert the heat transferred by working fluid heat exchanger 136 into mechanical energy 133 (e.g., torque within a rotating output shaft), as shown (at least embodying herein at least one heat-to-mechanical power converter adapted to convert such combustion heat to mechanical power and wherein such at least one heat-to-mechanical power converter comprises at least one Stirling-cycle engine structured and arranged to use the mechanical output of at least one Stirling cycle to produce mechanical power). Preferably, Stirling-cycle engine 134 is operationally coupled to electrical generator 138 (at least embodying herein at least one electrical generator adapted to generate electrical power) that converts mechanical energy 133 into electrical power 140.

As previously described, waste oil electrical cogeneration system 100 is preferably a cogeneration (or multi-generation) unit wherein waste-heat energy is derived from the system for beneficial use. In the example of FIG. 3B, waste-heat exchanger 144 (at least embodying herein at least one waste-heat heat exchanger structured and arranged to transfer at least one portion of the combustion heat to at least one heatable fluid) is brought into thermal relationship with combustion heat energy 132, drawing usable heat from combustion heat energy 132, as shown.

Figure 4:
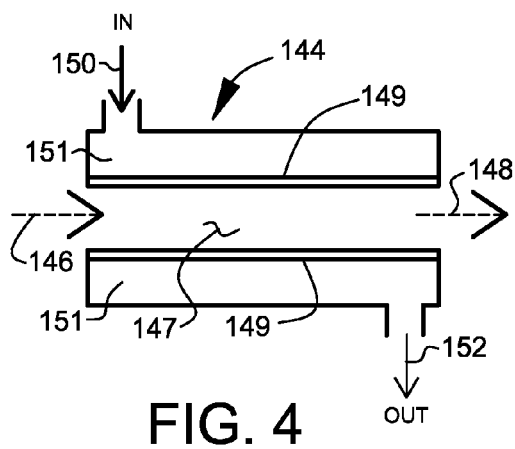
FIG. 4 is a diagrammatic illustration of the secondary fluid heat exchanger according to the preferred embodiment of FIG. 2A through FIG. 3B.

FIG. 4 is a diagrammatic illustration of waste-heat exchanger 144, according to the preferred embodiments of FIGS. 2A through 3B. In the highly simplified model of FIG. 4, waste-heat exchanger 144 comprises two approximately concentric pipes, each pipe having an input and output. Preferably, incoming combustion heat 146 is introduced into and moves through combustion chamber 147 before exiting as outgoing combustion heat 148, as shown. Similarly, a lower temperature incoming secondary fluid 150 is introduced into secondary fluid channel 151, where it moves around combustion chamber 147 before exiting as outgoing secondary fluid 152, as shown. As incoming secondary fluid passes around combustion chamber 147, heat energy is transferred from incoming combustion heat 146 to the lower temperature incoming secondary fluid 150, across secondary heat exchanger wall 149, thereby raising the temperature of incoming secondary fluid 150. In practical application, the efficiency of heat-energy transfer across secondary heat exchanger wall 149 can never achieve one hundred percent. Due to factors such as transfer surface area and material heat-transfer rates, a significant percentage of the heat energy of incoming combustion heat 146 will remain in outgoing combustion heat 148, discharged from the system as waste exhaust. Oil combustion burner systems for space heating may discharge as much as seventy percent of outgoing combustion heat 148 as waste exhaust.

Figure 5:
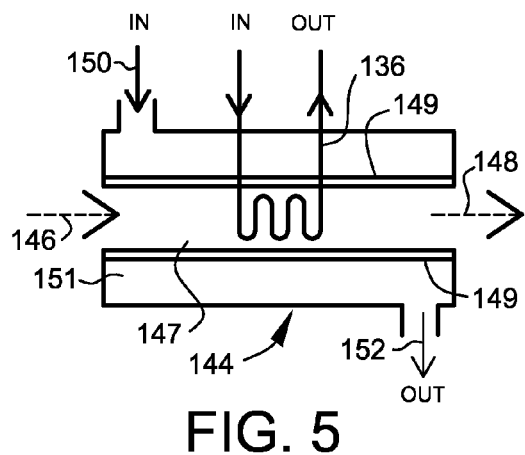
FIG. 5 is a diagrammatic illustration of the secondary fluid heat exchanger showing the working fluid heat exchanger introduced into the combustion chamber according to the preferred embodiments of FIG. 2A through FIG. 3B.

FIG. 5 is a diagrammatic illustration of waste-heat exchanger 144, showing working fluid heat exchanger 136 introduced into combustion chamber 147, according to the preferred embodiments of FIGS. 2A through 3B. By placing working fluid heat exchanger 136 into combustion chamber 147, waste oil electrical cogeneration system 100 effectively captures and utilizes heat energy of outgoing combustion heat 148 that is normally lost as waste exhaust, as shown. It should be noted that the introduction of working fluid heat exchanger 136 into combustion chamber 147 has minimal impact on the quantity or rate of heat energy transfer from incoming combustion heat 146 to incoming secondary fluid 150 across waste-heat heat exchanger wall 149.

Figure 6:
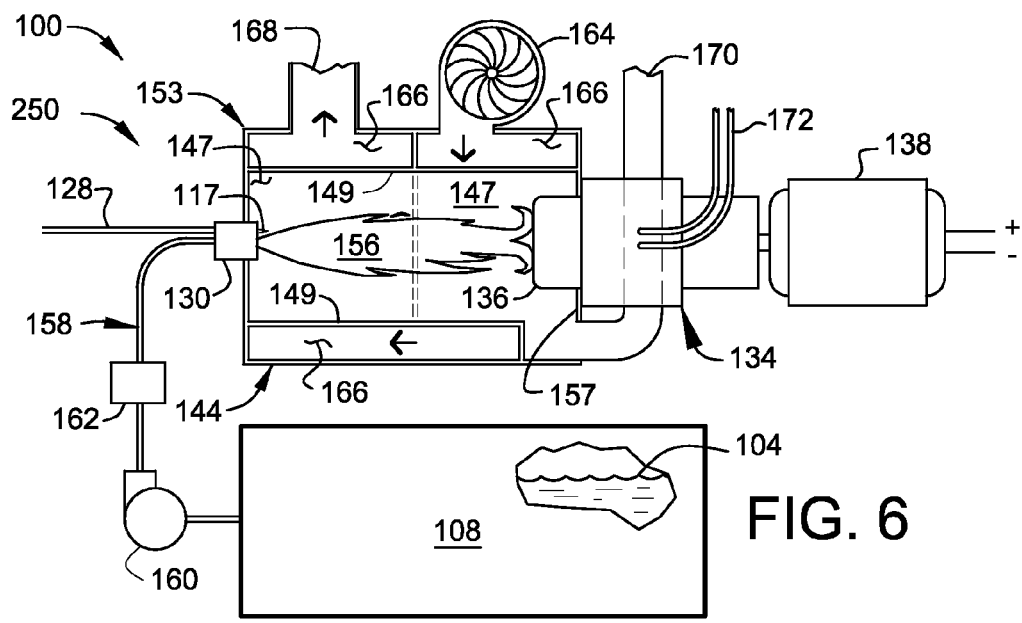
FIG. 6 is a diagrammatic configuration view of a waste oil cogeneration system according to a preferred embodiment of the present invention.

FIG. 6 is a diagrammatic sectional view of waste oil co-generator 250 of waste oil cogeneration system 100, according to a preferred embodiment of the present invention. Preferably, waste oil co-generator 250 is an assembly comprised of waste-oil-fired hot air furnace 153, modified to receive Stirling-cycle engine 134 and electrical generator 138, as shown. Preferably, waste-oil-fired hot air furnace 153 is a commercially available unit, for example, waste-oil-fired hot air furnaces produced by Clean Burn, Inc. of Leola, Pa., U.S.A. Waste oil burning devices of this type are also known by those skilled in the art as "multi-oil furnaces", and typically include a number of specific features to allow for efficient combustion of multiple waste oil types having varying physical properties.

In a typical arrangement, waste oil 104 is preferably held in waste oil collection tank 108 of waste oil electrical cogeneration system 100 prior to being transferred to waste oil combustor 130, via waste oil transfer assembly 158 (at least embodying herein at least one waste oil transfer component structured and arranged to transfer such on-site-generated environmentally hazardous waste oils from such at least one holder to such at least one combustion heater), as shown. Preferably, waste oil transfer assembly 158 includes waste oil pump 160 (at least embodying herein at least one pump structured and arranged to pump such on-site-generated environmentally hazardous waste oils from such at least one holder to such at least one combustion heater), as shown.

Typically, waste oil 104 is pre-conditioned before reaching waste oil combustor 130 by passing through waste oil volume/viscosity control 162, as shown. Pre-conditioning provided by waste oil volume/viscosity control 162 typically includes such actions as flow rate sampling, control of waste oil transfer rate and pre-heating of waste oil 104 to assist in managing oil viscosity for optimal combustion conditions within combustion chamber 147, as shown (at least embodying herein at least one flow volume regulator structured and arranged to regulate the flow volume of such on-site-generated environmentally hazardous waste oils pumped from such at least one holder to such at least one combustion heater; and at least one pre-heater structured and arranged to preheat such on-site-generated environmentally hazardous waste oils prior to burning). It is noted that the configuration and operation of such waste oil pre-conditioning devices is described in greater detail in, for example, U.S. Pat. No. 5,551,868 to Smoker et al., incorporated herein by reference for further examples of implementation engineering.

Preferably, waste oil combustor 130 is a highly efficient design, comprising at least one burner nozzle that combines a flow of compressed air 128 with a flow of pre-heated waste oil 104 (at least embodying herein at least one atomizer structured and arranged to atomize such on-site-generated environmentally hazardous waste oils prior to combustion). Preferably, the mixture of compressed air 128 and waste oil 104 is injected into combustion chamber 147, where ignition assembly 117 (at least embodying herein at least one igniter structured and arranged to ignite such on-site-generated environmentally hazardous waste oils after such on-site-generated environmentally hazardous waste oils have passed through such at least one atomizer) ignites the atomized mixture generating a focused combustion flame 156 directed to the interior of combustion chamber 147 (see also FIG. 10). It is noted that the configuration and operation of waste oil combustors (such as waste oil combustor 130) is described in greater detail in, for example, U.S. Pat. No. 6,048,197 to Beiler, incorporated herein by reference for further examples of implementation engineering. Commercially-available waste oil combustors of the type preferably used in the present invention may be supplied with an approximate thermal output ranging from about 100,000 BTUs/hr to over 500,000 BTUs/hr at temperatures of up to about 2,000 degrees Fahrenheit (at least embodying herein wherein such at least one combustion heater has a maximum capacity of not more than 0.5 million BTU input per hour).

Preferably, waste-heat exchanger 144 of waste-oil-fired hot air furnace 153 comprises at least one combustion chamber 147 surrounded on all sides by heat exchanger air channel 166, as shown. Preferably, air intake fan 164 moves the secondary fluid (comprising air in the present embodiment) through heat exchanger air channel 166, where it is heated before passing out of heat exchanger air channel 166 by means of hot air discharge 168, as shown. The heated air exiting hot air discharge 168 is preferably used to provide local space heating (at least embodying herein wherein such at least one waste-heat heat exchanger is structured and arranged to transfer heat to air usable for space heating) within the waste oil electrical cogeneration system site (as previously described in FIG. 1). Preferably, combustion chamber 147 includes combustion gas discharge flue 170 to remove spent combustion gases from the system, as shown (at least embodying herein wherein combustion gasses produced by the combustion of such on-site-generated environmentally hazardous waste oils is vented to the outside air). It is noted that the configuration and operation of such a waste-heat exchanger is described in greater detail in, for example, U.S. Pat. No. 5,531,212 to Smoker et al., incorporated herein by reference for further examples of implementation engineering.

It is currently preferred that within waste-oil-fired hot air furnace 153, working fluid heat exchanger 136 is introduced into combustion chamber 147 through back wall 157 (as apposed to Smoker et al., for example), thereby permitting a portion of the heat energy from the directed combustion flame 156 (at least embodying herein at least one directed heat flow) to be transferred to Stirling-cycle engine 134, as shown. Preferably, the configuration of working fluid heat exchanger 136 is such that combustion flame 156 is directed back in combustion chamber 147, thereby maintaining the overall efficiency of the combustion and heat transfer processes, as shown. Upon reading this specification, those with ordinary skill in the art will understand that, under appropriate circumstances, such as, to accommodate specific furnace thermal performance characteristics, user preference, advances in technology, etc., other positions of the working fluid heat exchanger within the combustion chamber, such as, for example, non-concentric, front mounted, etc., may suffice.

Preferably, Stirling-cycle engine 134 comprises a 480 cc four-piston alpha configuration, such as Model STM 4-120 produced by Stirling Thermal Motors, Inc. of Ann Arbor, Mich., U.S.A. Using a waste oil burner having a combustion flame temperature of approximately 1,400 degrees Fahrenheit (as measured at working fluid heat exchanger 136), Stirling-cycle engine 134 typically produces about 40 hp at an average shaft speed of about 1800 rpm. Preferably, Stirling-cycle engine 134 is coupled to an "off-the-shelf" induction-type electrical generator 138, preferably having a rated electrical output (after inverter processing) of 25 kW at 480 VAC/3-phase at 60 Hz. Further, Stirling-cycle engine 134 typically produces up to 150,000 BTUs/Hr of hot water from the engine's internal coolant circuit, delivered by means of Stirling engine coolant lines 172, as shown.

Figure 7:
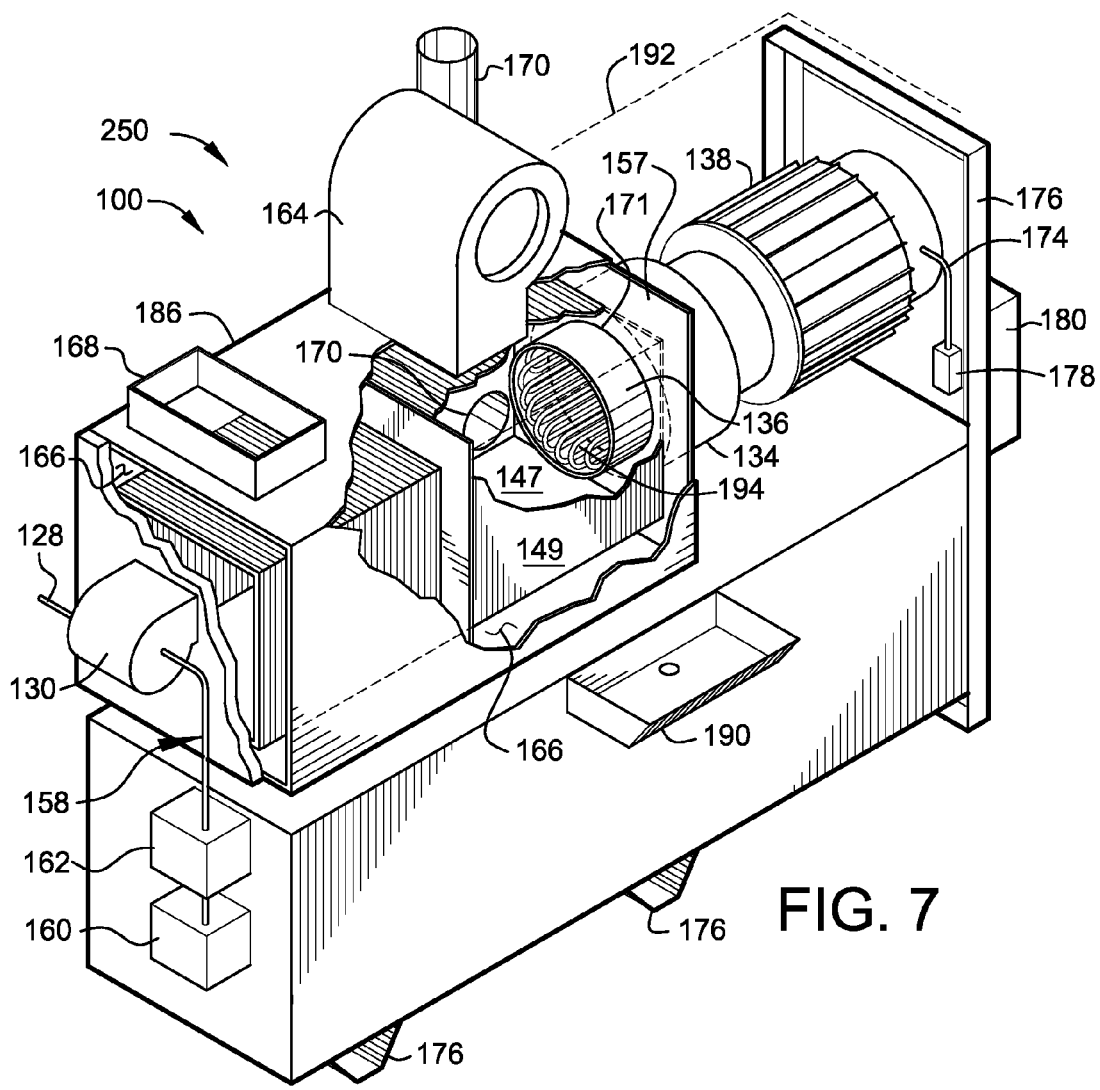
FIG. 7 is a perspective view, in partial section, of the waste oil cogeneration system of the preferred embodiment of FIG. 6.

FIG. 7 is a perspective view, in partial section, of the waste oil cogeneration system 100, according to the preferred embodiment of FIG. 6. The cut-away view of FIG. 7 more clearly shows the preferred arrangement of working fluid heat exchanger 136 within combustion chamber 147. Modifications to Stirling-cycle engine 134 required to permit the engine to be incorporated into waste oil cogeneration system 100 are clearly within the abilities of those skilled in the art in light of the present teachings, preferably limited to removal of the factory burner assembly.

Preferably, back wall 157 of combustion chamber 147 is prepared to receive Stirling-cycle engine 134, by cutting heat exchange aperture 171 through back wall 157, and by further locating and drilling appropriately-sized mounting holes matching the standard mounting holes of the Stirling-cycle engine factory burner assembly. Upon reading this specification, those with ordinary skill in the art will understand that, under appropriate circumstances, such as heavy duty applications, specific furnace/engine combinations, etc., other assemblies, such as, for example, additional plate adapters and/or reinforcing added to back wall 157 to further anchor and support Stirling-cycle engine 134, may suffice.

Preferably, working fluid transfer lines 194 of working fluid heat exchanger 136 are oriented to be in direct contact with the focus of combustion flame 156, as shown. Upon reading this specification, those with ordinary skill in the art will understand that, under appropriate circumstances, such as to enhance the performance of the heat transfer processes within the waste oil cogeneration system, the use of other heat-retaining, heat-blocking and heat-directing elements, such as, for example, ceramic shapes, heat-resistant deflectors, etc., may be used at various positions within the combustion chamber. For example, a metallic or ceramic heat-directing ring placed around working fluid heat exchanger 136 to control the return path of combustion flame 156, may suffice.

Preferably, the overall configuration of waste oil cogeneration system 100 comprises a self-contained unit having an internal system support structure 176, preferably constructed from metal, preferably steel, as shown. Preferably, all external access panels 192 are removable for servicing and inspection, as shown. Preferably, collection tank 108 includes one or more waste oil collection assemblies 190 to assist in the collection and storage of waste oil 104, as shown (at least embodying herein wherein such at least one holder comprises at least one collector structured and arranged to assist in collecting such on-site-generated environmentally hazardous waste oils). Upon reading this specification, those with ordinary skill in the art will understand that, under appropriate circumstances, such as to address issues of user preference, advances in technology, etc., other locations for the waste oil collection point, such as, for example, exterior collection assemblies, remote collection areas, etc., may suffice.

Electrical power assemblies 178 preferably route power from electrical generator 138 to electrical power controls 180 mounted on or near waste oil cogeneration system 100, as shown. Preferably, electrical power controls 180 include such devices as: safety breakers, power disconnects, power monitors and controllers, charge controllers for a battery storage system (at embodying herein wherein such at least one electrical controller is structured and arranged to control at least one transfer of electrical power between such at least one electrical storage device and such at least one electrical network) and power inverters, including trace PS and SW series inverters for utility grid connection capability (at least embodying herein at least one electrical controller structured and arranged to control electrical power within such at least one electrical network, and wherein such at least one electrical controller is structured and arranged to control electrical power flowing between such at least one electrical network and the at least one larger electrical grid), thereby permitting the sale of surplus-generated power back to the utility through net metering or similar programs (embodying herein using surplus usable heat energy from combusting such on-site-generated environmentally hazardous waste oils for on-site heating uses). Further, those of ordinary skill in the art will, upon reading this specification understand that, under appropriate circumstances, electrical power controls 180 may include internal power metering to allow, for example, the manufacturer of waste oil cogeneration system 100 to place units within a waste oil cogeneration site on a cost partnership basis (where all or a pre-arranged portion of the electrical power generated by waste oil cogeneration system 100 is sold by the manufacturer to the co-generating site, at a grid competitive or pre-arranged rate). The above-described preferred arrangement herein embodies: collecting on-site-generated environmentally hazardous waste oils; combusting such on-site-generated environmentally hazardous waste oils to produce usable heat energy; using such usable heat energy to power at least one Stirling-cycle engine; using the output from such Stirling-cycle engine to generate useful electrical power; and selling at least one portion of such useful electrical power by way of at least one electrical grid connection. Preferably, waste oil cogeneration system 100 is scalable to larger generation applications by using the combined generating power of multiple waste oil cogeneration system(s) 100.

Figure 8A:
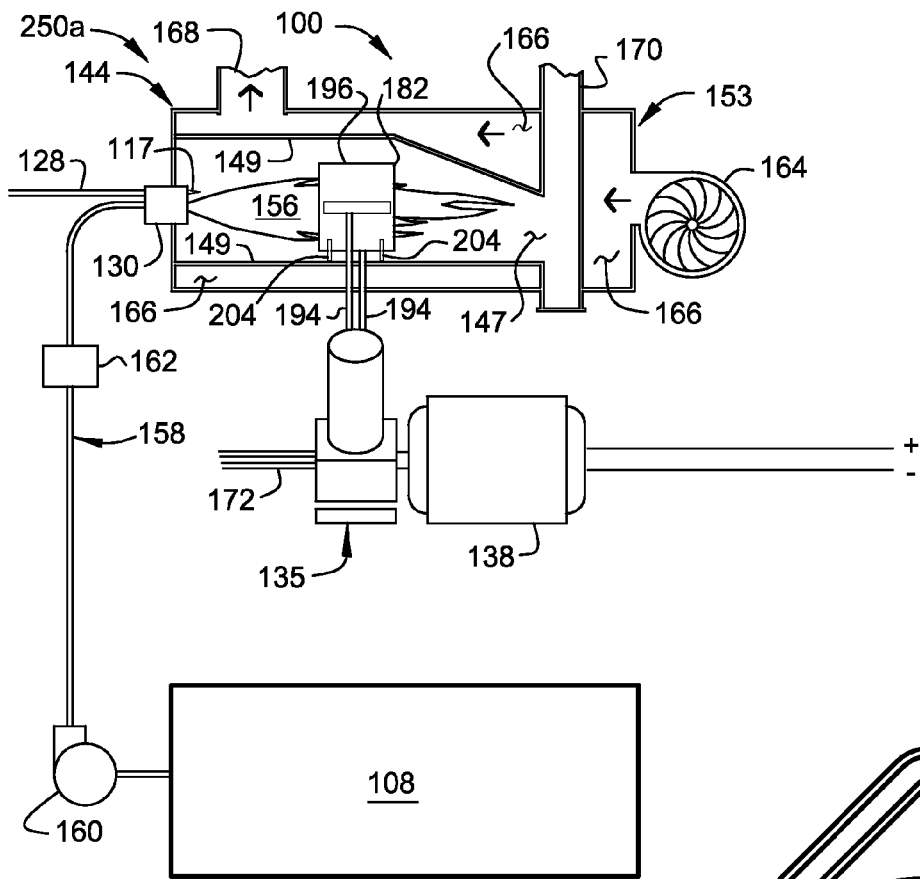
FIG. 8A is a diagrammatic sectional view of an alternate preferred waste oil cogeneration system according to an alternate preferred embodiment of the present invention.

FIG. 8A is a diagrammatic sectional view of an alternate preferred waste oil co-generator 250a of waste oil cogeneration system 100, according to another highly preferred embodiment of the present invention. Preferably, waste oil co-generator 250a is an assembly comprised of waste-oil-fired hot air furnace 153 modified to receive toroidal-shaped heat exchanger 196 of Stirling-cycle engine 135, as shown. Preferably, waste-oil-fired hot air furnace 153 is a commercially available unit produced by Black Gold Corporation of Nashville, Tenn., U.S.A.

Preferably, waste oil 104 is held in waste oil collection tank 108 (of waste oil co-generator 250a) prior to being transferred to waste oil combustor 130, via waste oil transfer assembly 158, as shown. Preferably waste oil transfer assembly 158 includes waste oil pump 160 (at least embodying herein at least one pump to pump such on-site-generated environmentally hazardous waste oils from such at least one holder to such at least one combustion heater), as shown. Depending on such factors as temperature and the type of waste oil being burned, waste oil 104 may be pre-conditioned before reaching waste oil combustor 130 by passing through waste oil volume/viscosity control 162, as shown. Pre-conditioning provided by waste oil volume/viscosity control 162 may include such actions as flow rate sampling, control of waste oil transfer rate and pre-heating of waste oil 104 to assist in managing oil viscosity for optimal combustion conditions within combustion chamber 147, as shown. Preferably, waste oil combustor 130 comprises a burner nozzle that combines a flow of compressed air 128 with a flow of pre-heated waste oil 104. Preferably, the mixture of compressed air 128 and waste oil 104 is injected into combustion chamber 147, where an ignition assembly 117 ignites the atomized mixture generating combustion flame 156, as shown. It is noted that the configuration and operation of such waste oil pre-conditioning devices is described in greater detail in, for example, U.S. Pat. No. 5,879,149 to Briggs et al., incorporated herein by reference for further examples of implementation engineering. Preferably, waste-heat exchanger 144 of waste-oil-fired hot air furnace 153 comprises combustion chamber 147, surrounded on all sides by heat exchanger air channel 166, as shown.

Preferably, air intake fan 164 moves the secondary fluid (in this case air) through heat exchanger air channel 166, where it is heated, before passing out of heat exchanger air channel 166 through hot air discharge 168, as shown. The heated air exiting hot air discharge 168 is again preferably used to provide local space heating within the waste oil electrical cogeneration system site (as previously described in FIG. 1). Preferably, combustion chamber 147 includes combustion gas discharge flue 170 to remove spent combustion gases from the system, as shown. It is noted that the configuration and operation of such a waste-heat exchanger is described in greater detail in, for example, U.S. Pat. No. 4,955,359 to Briggs et al. and U.S. Pat. No. 5,363,836 to Briggs, incorporated herein by reference for further examples of implementation engineering.

Toroidal-shaped heat exchanger 196 is preferably coaxially positioned within the interior of combustion chamber 147, preferably along the chamber's longitudinal axis, preferably at a position equidistant from waste oil combustor 130 and combustion gas discharge flue 170, as shown. Toroidal-shaped heat exchanger 196 may be firmly positioned within combustion chamber 147 by a plurality of support members 204 anchored to heat exchanger wall 149, as shown. Preferably, combustion flame 156 is directed to pass through the interior of toroidal-shaped heat exchanger 196, as shown. In the preferred embodiment of FIG. 8A, working fluid transfer lines 194 provide the fluid transfer path between toroidal-shaped heat exchanger 196, and Stirling-cycle engine 135, as shown. The above-described embodiment allows Stirling-cycle engine 135 to be located outside waste-oil-fired hot air furnace 153 in a preferred arrangement, as shown. Upon reading this specification, those with ordinary skill in the art will understand that, under appropriate circumstances, such as, user preference, advances in technology, particular space/cost/use circumstances, etc., other selection of internal/external arrangements, may suffice.

As one preferred example, Stirling-cycle engine 135 comprises a 160 cc 90° V-2-cylinder unit, preferably Model V-160 produced by Solo Kleinmoteren GmbH of Sindelfingen, Germany. Using a waste oil burner having a combustion flame temperature of approximately 1,300 degrees Fahrenheit (700° C.) (as measured at working fluid heat exchanger 136), Stirling-cycle engine 135 produces about 11 kW of mechanical power at an average shaft speed of about 1500 rpm (with working fluid heat exchanger 136 maintaining an average working gas pressure of 15 Mpa). Preferably, Stirling-cycle engine 135 is coupled to an induction-type electrical generator 138, having a rated electrical output (after inverter processing) of 25 kW at 480 VAC/3-phase at 60 Hz. Further, Stirling-cycle engine 135 produces up to 150,000 BTUs/Hr of hot water from the engine's internal coolant circuit delivered through Stirling engine coolant lines 172, as shown.

Figure 8B:
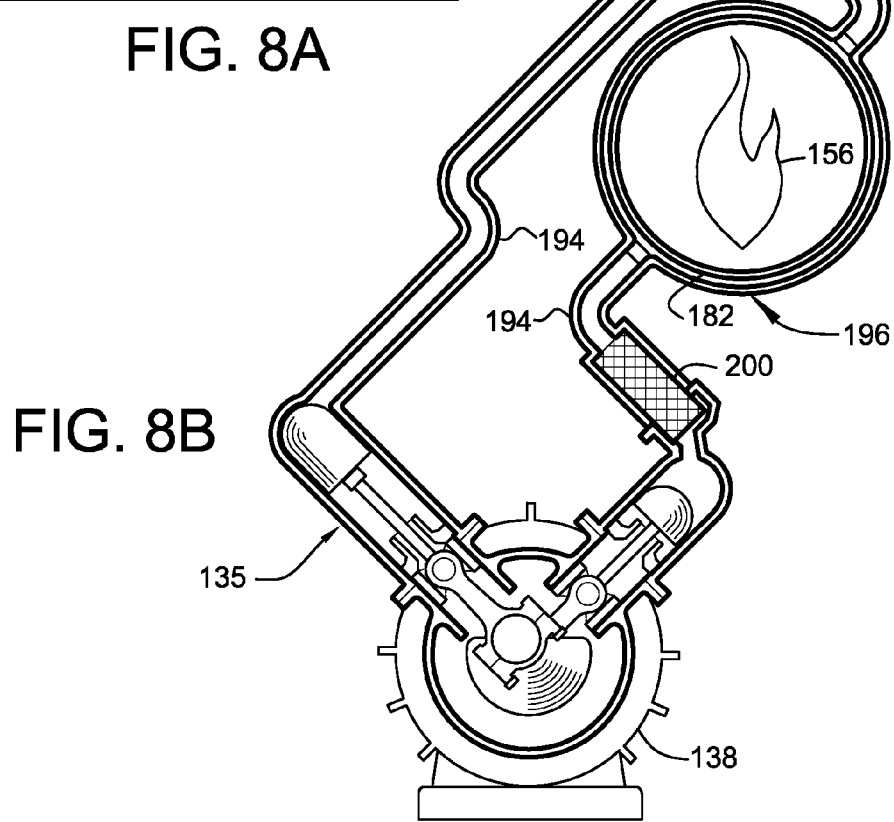
FIG. 8B is a diagrammatic illustration, partially in section, of the torodial-shaped working fluid heat exchanger, Stirling-cycle engine, and electrical generator of the alternate preferred embodiment of FIG. 8A.

FIG. 8B is a diagrammatic illustration, partially in section, of the torodial-shaped working fluid heat exchanger 196, Stirling-cycle engine 135, and electrical generator 138 of the alternate preferred embodiment of FIG. 8A.

Preferably, toroidal-shaped working fluid heat exchanger 196 is formed from a tightly-coiled arrangement of heat exchange tubes 182, as shown. Preferably, heat exchange tubes 182 and working fluid transfer lines 194 each comprise ¼" diameter tubing, preferably constructed from stainless steel or heat-resistant inconel 713/625. Upon reading this specification, those with ordinary skill in the art will understand that, under appropriate circumstances, in consideration of such issues as material cost, user preference, advances in technology, etc., other working fluid transfer line configurations, such as, for example, alternate tubing diameters, heat-resistant materials, etc., may suffice.

Figure 9:
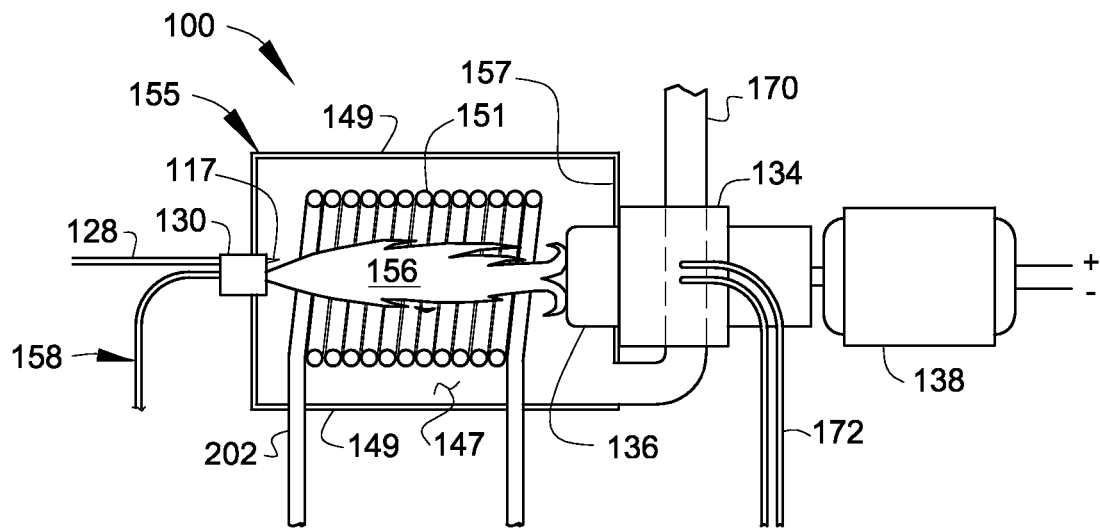
FIG. 9 is a diagrammatic sectional view of a waste oil cogeneration system according to yet another preferred embodiment of the present invention.

FIG. 9 is a diagrammatic sectional view of waste oil cogeneration system 100, according to another preferred embodiment of the present invention. Preferably, waste oil electrical cogeneration system 100 comprises a waste-oil-fired hot water boiler 155 modified to receive Stirling-cycle engine 134, as shown. As one preferred example, waste-oil-fired hot water boiler 155 may comprise a commercially available unit produced by Clean Burn, Inc. of Leola, Pa., U.S.A.

In operation, waste oil 104 is preferably transferred to waste oil combustor 130, via waste oil transfer line 158, as shown. As in the prior embodiments of FIG. 6 and FIG. 8A, waste oil combustor 130 is preferably a high-efficiency design comprising at least one burner nozzle that combines a flow of compressed air 128 with a flow of pre-heated waste oil 104 that, when ignited within combustion chamber 147, generates focused combustion flame 156, as shown. It is noted that the configuration and operation of waste oil combustors, such as waste oil combustor 130, is described in greater detail in, for example, U.S. Pat. No. 6,048,197 to Beiler, incorporated herein by reference for further examples of implementation engineering (see FIG. 10). Commercially available waste oil combustors of the type preferably used in the present invention may be supplied with an approximate thermal output ranging from about 100,000 BTUs/hr more than 500,000 BTUs/hr at temperatures of up to about 2,000 degrees Fahrenheit, well within the operating requirements of Stirling-cycle engine 134.

Preferably, waste-oil-fired coil tube boiler 155 comprises at least one combustion chamber 147 containing coiled tube heat exchanger 202, as shown. Preferably, water pumped through coiled tube heat exchanger 202 is heated by combustion flame 156, as shown. The hot water exiting coiled tube heat exchanger 202 is preferably used to provide local domestic hot water or space heating within the waste oil electrical cogeneration system site. Preferably, combustion chamber 147 includes combustion gas discharge flue 170 to remove spent combustion gases from the system, as shown. It is noted that the configuration and operation of such a waste-oil-fired coil tube boiler is described in greater detail in, for example, U.S. Pat. No. 6,085,701 to Stauffer et al., incorporated herein by reference for further examples of implementation engineering.

In the waste oil boiler taught by Stauffer et al. (U.S. Pat. No. 6,085,701), combustion flame 156 is fired toward the back wall of combustion chamber 147. Applicant prefers that, in applicant's waste-oil-fired coil tube boiler 155, working fluid heat exchanger 136 is introduced into combustion chamber 147 through back wall 157 (as apposed to Smoker et al. and Stauffer et al., for example), thereby permitting a portion of the heat energy from combustion flame 156 to be transferred to Stirling-cycle engine 134, as shown. Preferably, the configuration of working fluid heat exchanger 136 is such that combustion flame 156 is directed back in combustion chamber 147, thereby maintaining the overall efficiency of the combustion and heat transfer processes, as shown. Upon reading this specification, those with ordinary skill in the art will understand that, under appropriate circumstances, such as, to accommodate specific furnace thermal performance characteristics, user preference, advances in technology, etc., other positions of the working fluid heat exchanger within the combustion chamber, such as, for example, non-concentric, front mounted, etc., may suffice.

As a preferred example embodiment, Stirling-cycle engine 134 may comprise a 480 cc four-piston alpha configuration, such as Model STM 4-120 produced by Stirling Thermal Motors, Inc. Using a waste oil burner having a combustion flame temperature of approximately 1,400 degrees Fahrenheit (as measured at working fluid heat exchanger 136), Stirling-cycle engine 134 produces about 40 hp at an average shaft speed of about 1800 rpm. Preferably, Stirling-cycle engine 134 is coupled to an induction-type electrical generator 138, preferably having a rated electrical output (after inverter processing) of 25 kW at 480 VAC/3-phase at 60 Hz. Further, Stirling-cycle engine 134 preferably produces up to 150,000 BTUs/Hr of additional hot water from the engine's internal coolant circuit delivered through Stirling engine coolant lines 172, as shown. It should be noted that, under appropriate circumstance, other Stirling-cycle engine/generator designs may be used within the above-described embodiments, for example, the Stirling engine/generator combinations produced by the Stirling Technology Company of Kennewick, Wash., U.S.A.

Figure 10:
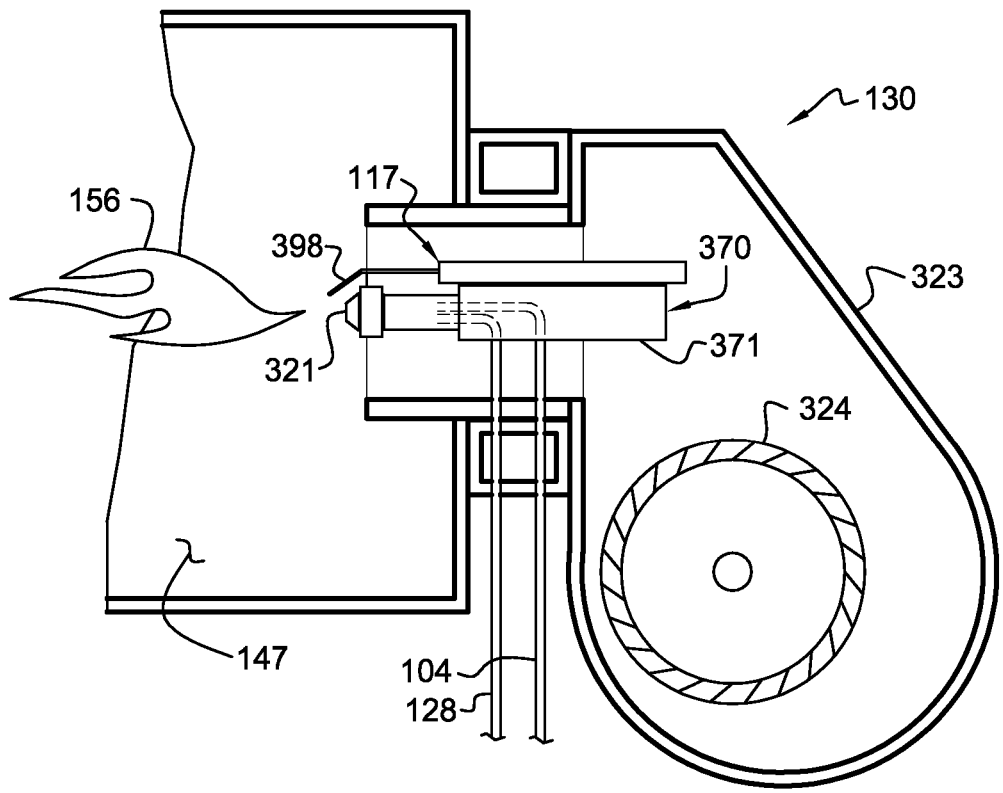
FIG. 10 is a sectional view through a typical waste oil combustor according to a preferred embodiment of the present invention.

FIG. 10 is a sectional view through typical waste oil combustor 130 according to the preferred embodiments of the present invention. It is noted that the configuration and operation of waste oil combustors (such as waste oil combustor 130) is described in greater detail in, for example, U.S. Pat. No. 6,048,197 to Beiler, incorporated herein by reference for further examples of implementation engineering.

As generally discussed in Bieler, waste oil combustor 130 includes burner nozzle 321 and ignition assembly 117 to create a flame from the supplied waste oil 104, as shown. Preferably, waste oil combustor 130 also includes housing 323 in which is mounted fan 324 to supply large quantities of combustion air over nozzle 321 and ignition assembly 117 to support the creation of flame 156 in combustion chamber 147, as shown.

Preferably, burner nozzle assembly 370 includes burner nozzle 321 and ignition assembly 117 (at least embodying herein at least one igniter structured and arranged to ignite such on-site-generated environmentally hazardous waste oils after such on-site-generated environmentally hazardous waste oils have passed through such at least one atomizer), as shown. Preferably, burner nozzle 321 includes nozzle housing 371 having passageways for the flow of compressed air 128 and waste oil 104 in a known manner to create a flame projected into combustion chamber 147.

Preferably, preheated waste oil 104 flows into burner nozzle 321 (at least embodying herein embodying herein atomizer means for atomizing such on-site-generated environmentally hazardous waste oils prior to combustion, and at least embodying herein at least one atomizer structured and arranged to atomize such on-site-generated environmentally hazardous waste oils prior to combustion) to exit in a fine stream. Meanwhile, preheated compressed air 128 preferably flows through another passageway into burner nozzle 321 where the flow of compressed air 128 is directed in a slightly spiraled path. Preferably, compressed air 128 and waste oil 104 are combined at the tip of burner nozzle 321 to effect an atomizing of the waste oil stream, resulting in a combined stream of compressed air and atomized waste oil droplets being ejected from the tip, whereupon it is ignited into a flame by the electrodes 398, of ignition assembly 117.

Figure 11:
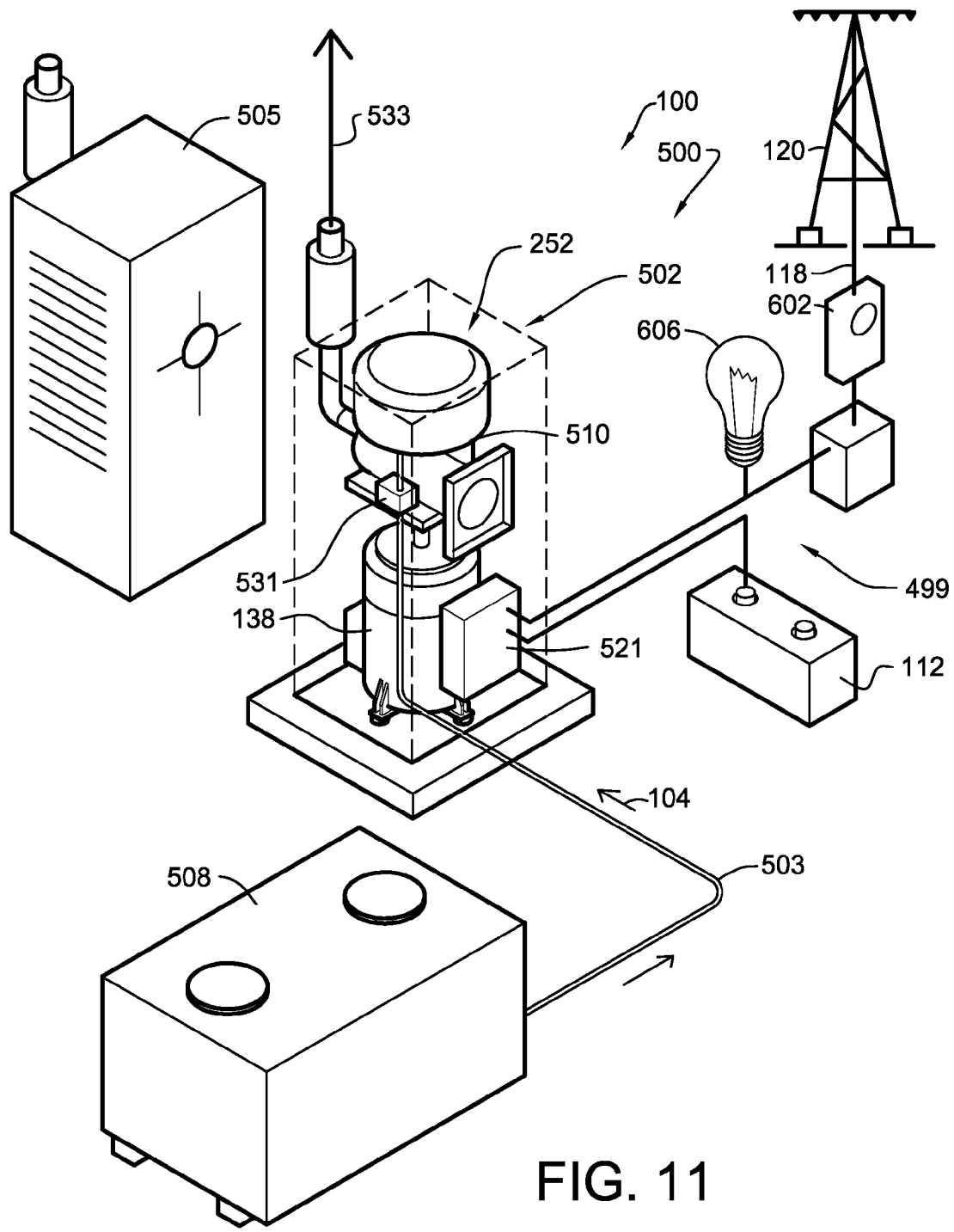
FIG. 11 is a diagrammatic perspective view, illustrating in general, a preferred organization of a waste oil distributed cogeneration site, according to another preferred embodiment of the present invention.
Figure 13A:
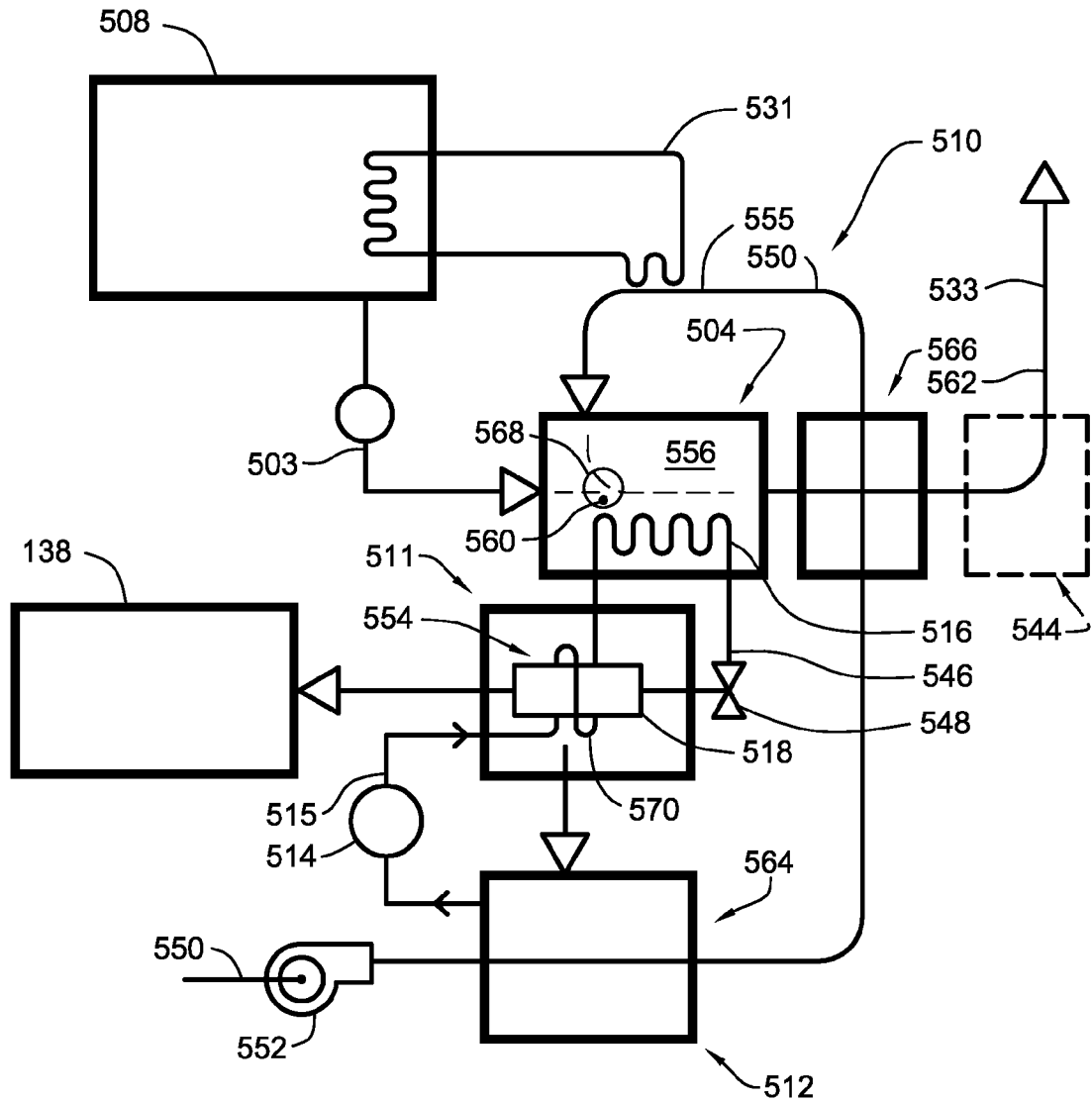
FIG. 13A is a diagrammatic illustration of a waste-oil driven electrical generation unit, of the alternate preferred embodiment of FIG. 11.

FIG. 11 is a schematic diagram illustrating a preferred organization of alternate waste-oil distributed cogeneration site 500, according to another preferred embodiment of the present invention. Alternate waste-oil distributed cogeneration site 500 of waste oil cogeneration system 100 preferably comprises at least one waste-oil electrical generation unit 502 operably coupled to at least one waste-oil collection tank 508, as shown. Waste-oil collection tank 508 is preferably used to collect and store environmentally hazardous waste oil 104 produced primarily on site, typically by one or more service-type operations (at least embodying herein at least one holder structured and arranged to hold on-site-generated environmentally hazardous waste oils produced by the at least one on-site process). Upon reading this specification, those with ordinary skill in the art will now appreciate that, under appropriate circumstances, considering such issues as changes in regulations, interpretation, etc., other collections arrangements such as, for example, collecting and using off-site-generated environmentally hazardous waste oils, etc., may suffice. At least one waste oil transfer component 503 is preferably provided to transfer the waste oil 104 from waste-oil collection tank 508 (at least embodying herein at least one holder) to waste-oil electrical generation unit 502, as shown. Preferred embodiments of waste oil transfer component 503 preferably comprise at least one waste-oil pre-heater 531 structured and arranged to preheat waste oil 104 prior to burning. Waste-oil pre-heater 531 is preferably configured to operate using primarily the combustion heat produced by the burning of waste oil 104, as shown in FIG. 13A.

Waste oil 104 is burned, in controlled manner, within waste-oil electrical generation unit 502 to produce both electrical power and usable heat energy. Waste-oil electrical generation unit 502 preferably comprises at least one thermodynamic energy converter to convert heat energy from the combustion of waste oil 104 to an output of mechanical work. Such a thermodynamic energy converter, identified herein as heat-to-mechanical-power converter 252, is preferably coupled to electrical generator 138, which is preferably used to produce electrical power for on-site use, as shown.

Alternate waste-oil distributed cogeneration site 500 preferably comprises at least one onsite electrical network 499 to electrically couple electrical generator 138 and at least one on-site load 606, as shown. Electrical network 499 preferably comprises electrical control subsystem 521 (as least embodying herein at least one power controller) structured and arranged to control the output of the electrical power of electrical generator 138 to electrical network 501. In a preferred embodiment of the present system, electrical network 499 preferably comprises a net-metering capability whereby the output of electrical generator 138 is coupled to a larger electrical power grid 120. Thus, any power in excess of that used by onsite loads 606 can be fed directly into the utility grid through electrical meter 602 and electrical grid connection 118, as shown (see FIG. 16 for additional hardware arrangements). Alternately preferably, the system may comprise a grid-independent arrangement whereby excess power is fed to a local energy storage system 112, as shown.

Electrical grid connection 118 also preferably allows distributed cogeneration site 500 to draw electrical power from larger electrical power grid 120 in circumstances where the overall power demand of distributed cogeneration site 500 exceeds the generation capacity of waste-oil electrical generation unit 502. Waste-oil electrical generation unit 502 is preferably capable of providing emergency, standby, peak shaving, and continuous electrical power to a wide range of electrically-dependent on-site operations.

In preferred embodiments of the system, exhaust gases 533 generated by the operation of waste-oil electrical generation unit 502 are preferably discharged directly to atmosphere, as shown. Alternately preferably, the hot exhaust gases 533 are preferably used to drive at least one modular waste-heat-recovery unit 505 (shown in FIG. 11 detached from waste-oil electrical generation unit 502). When the units are operably coupled, modular waste-heat-recovery unit 505 is preferably configured to transfer the combustion heat to at least one secondary heatable fluid, preferably using at least one internal waste-heat exchanger. As in the prior preferred embodiments of the system, the secondary heatable fluid preferably comprises air (for space-heating), alternately preferably water (as further illustrated in FIG. 15), alternately preferably another heat-engine working fluid (as further illustrated in FIG. 16).

Each waste-heat-recovery unit 505 is preferably of modular design, thus allowing either water-heating units, air-heating units, and/or organic heat-engine units to be operably coupled to waste-oil electrical generation unit 502. Upon reading this specification, those with ordinary skill in the art will now appreciate that, under appropriate circumstances, considering such issues as local requirements, user preference, etc., other waste-heat heat recovery arrangements such as, for example, utilizing waste heat to perform etc., may suffice.

Figure 12:
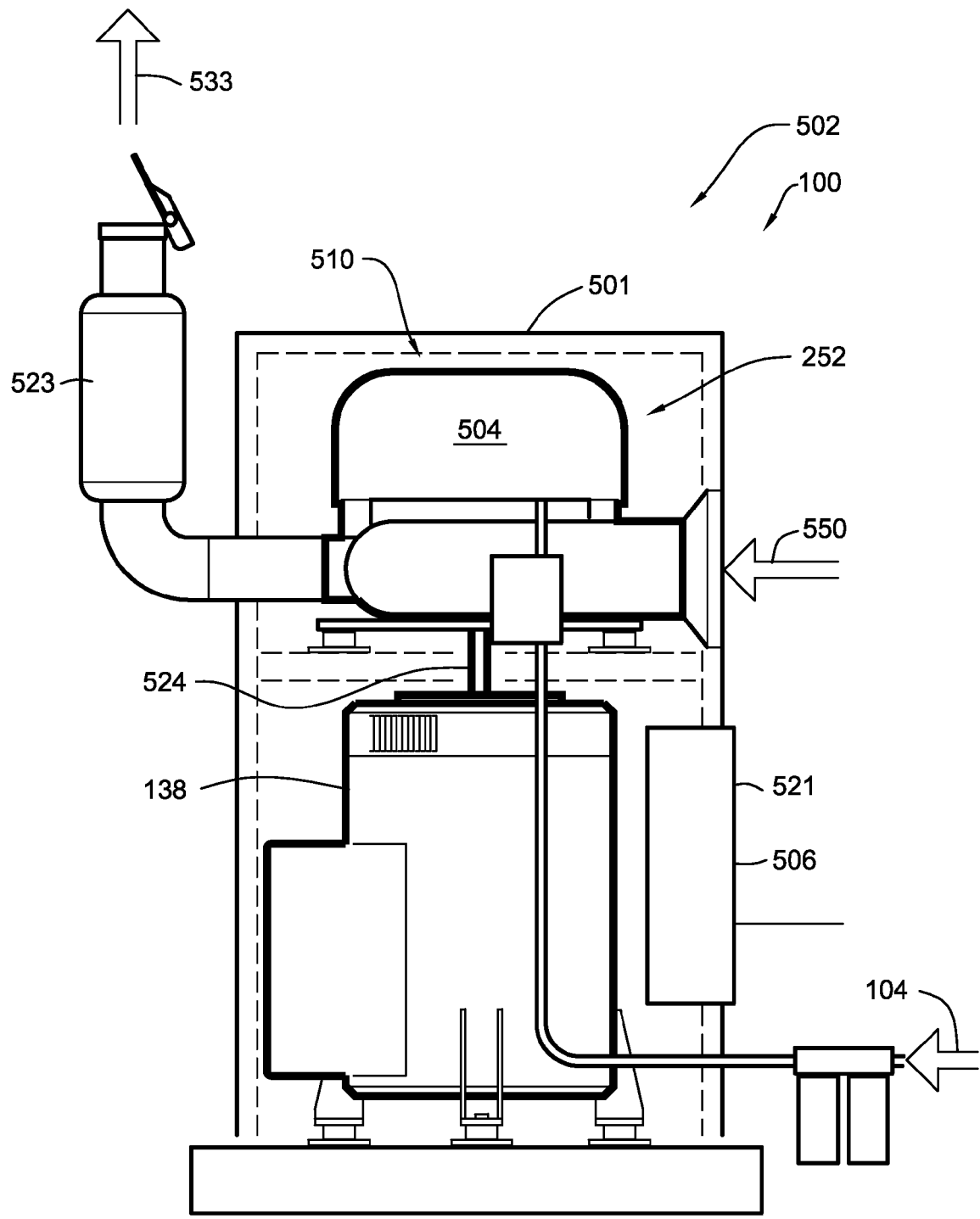
FIG. 12 is a diagrammatic illustration of a compact waste-oil driven electrical generation unit of the alternate preferred embodiment of FIG. 11.

FIG. 12 is a diagrammatic illustration of a compact waste-oil driven electrical generation unit 502 of the alternate preferred embodiment of FIG. 11. Reference is now made to FIG. 12 with continued reference to FIG. 11. As noted above, waste-oil electrical generation unit 502 preferably comprises at least one thermodynamic energy converter identified herein as heat-to-mechanical-power converter 252, as shown. Preferably, an output shaft 524 of heat-to-mechanical-power converter 252 operationally couples heat-to-mechanical-power converter 252 to electrical generator 138, which is preferably adapted to produce electrical power using mechanical energy produced by heat-to-mechanical-power converter 252.

Heat-to-mechanical-power converter 252 preferably comprises a regenerative external combustion engine implementing an efficient Rankine power cycle. In a preferred embodiment of waste-oil electrical generation unit 502, heat-to-mechanical-power converter 252 preferably comprises a compact steam-driven turbine. It is noted that the configuration and operation of such a compact steam-driven turbine is described in greater detail in, for example, U.S. patent application Ser. No. 11/895,667 to Schoell, incorporated herein by reference for further examples of implementation engineering. In a more highly preferred embodiment of waste-oil electrical generation unit 502, heat-to-mechanical-power converter 252 preferably comprises an external-combustion piston engine 510 adapted to convert the heat of combustion to rotary mechanical power, also preferably using an efficient variant of the Rankine cycle. Upon reading this specification, those with ordinary skill in the art will now appreciate that, under appropriate circumstances, considering such issues as cost, design preference, etc., other engine configurations such as, for example, the use of Wankel-type rotary engines, etc., may suffice.

External-combustion piston engine 510, electrical generator 138, and the supporting operational components of the generator set are preferably housed within outer enclosure 501, preferably providing both weather protection and sound attenuation. Outer enclosure 501 preferably comprises internal structural framing sufficient to securely support external-combustion piston engine 510 in a position above electrical generator 138, as shown. Connections between external-combustion piston engine 510, electrical generator 138, and the supporting structures of outer enclosure 501 may preferably comprise one or more vibration-isolation devices, as shown. Upon reading this specification, those with ordinary skill in the art will now appreciate that, under appropriate circumstances, considering such issues as engine configuration, cost, etc., other coupler arrangements such as, for example, the use of specific gear-reduction assemblies, vibration dampers, clutch mechanisms, universal joints, fluid or magnetic couplers, etc., may suffice.

An onboard electrical control subsystem 521, which preferably monitors and controls both engine performance and generator output, is preferably housed in an externally accessible cabinet 506, as shown. The housing of onboard electrical control subsystem 521 is preferably sealed for environmental protection, allowing control systems to be installed within the externally accessible switchgear cabinet 506.

Exhaust gases 533 are preferably discharged through exhaust assembly 523, as shown. Exhaust assembly 523 may preferably discharge directly to atmosphere, as shown. Alternately preferably, exhaust assembly 523 may preferably be coupled to one or more waste-heat exchangers 544 configured to capture and utilize waste-heat discharged from waste-oil electrical generation unit 502 (see FIG. 15).

Figure 13B:
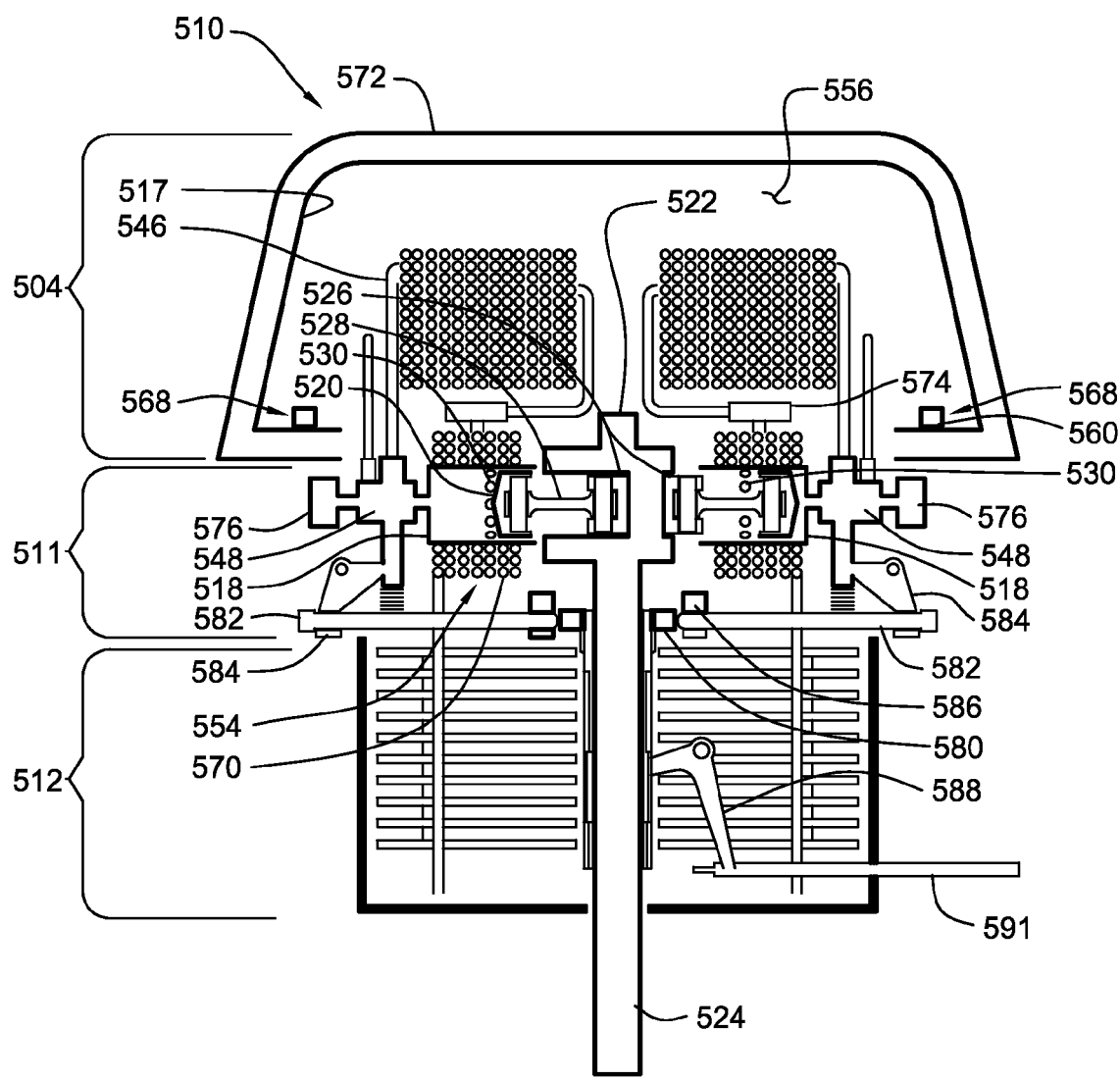
FIG. 13B is a diagrammatic sectional illustration of the waste-oil driven electrical generation unit, of the alternate preferred embodiment of FIG. 11.

FIG. 13A is a diagrammatic illustration of a waste-oil driven electrical generation unit, of the alternate preferred embodiment of FIG. 11. FIG. 13B is a diagrammatic sectional illustration of the waste-oil driven electrical generation unit, of the alternate preferred embodiment of FIG. 11. In specific reference to FIG. 13A and FIG. 13B, external-combustion piston engine 510 preferably produces mechanical shaft power by vaporizing and condensing a working fluid circulated within a closed-loop circuit. The working fluid is most preferably water. Alternately preferably, the working fluid comprises an organic compound exhibiting a phase-change temperature lower than water at a given temperature, as further discussed in FIG. 16 (at least embodying herein wherein the working fluid is at least one organic fluid comprising at least one liquid-vapor phase occurring at a lower temperature than that of water at a given pressure). In the preferred power cycle, the working fluid is pumped under pressure to combustion heater 504, as shown. It is then heated by combustion heater 504 to the boiling temperature, and is most preferably superheated (heated to a temperature above that of boiling). The resulting pressurized steam is preferably transferred to at least one thermodynamic energy converter, preferably comprising a reciprocating piston section 511 preferably adapted to convert the steam to rotary shaft power (at least embodying herein at least one thermodynamic energy converter structured and arranged to convert heat extracted from the vaporized working fluid into at least one output of mechanical work). The working fluid exits reciprocating piston section 511 at a lower pressure and is then preferably exhausted to condenser 512. Feedwater pump 514 preferably returns the condensed working fluid from condenser 512 to combustion heater 504 to continue the cycle.

Reciprocating piston section 511 preferably comprises a radial arrangement of cylinders 518 each one containing a piston 520 reciprocally disposed therein. Each cylinder 518 comprises a plurality of exhaust transfer passages 530 structured and arranged to exhaust the working fluid from the interior of cylinder 518 to condenser 512.

A centrally disposed crankshaft 522 is preferably provided to translate motion of the pistons into rotation of output shaft 524. Each piston 520 is preferably coupled to crankshaft 522 by a connecting rod 528 pivotally coupled to a freely-rotating crank disk 526 mounted to crankshaft 522, as shown.

Combustion heater 504 preferably comprises at least one air intake path 550, preferably comprising at least one air blower 552, preferably configured to deliver a flow of combustion air 555 to combustion chamber 556 of combustion heater 504, as shown. Combustion chamber 556 preferably comprises an arrangement of burners 568, preferably containing at least one atomizer 558, preferably configured to produce an atomized mist of waste oil 104 within a cyclonic circulation of combustion air 555 (at least embodying herein at least one combustion nozzle assembly structured and arranged to produce the at least one cyclonic circulation of the hot combustion gases adjacent such at least one multi-tube coil, wherein such at least one combustion nozzle assembly comprises such at least one air blower for producing such cyclonic circulation of hot combustion gases and such at least one atomizer). At least one ignition source 560 is preferably used to ignite the atomized mist of waste oil 104 suspended within the flow of combustion air 555.

Combustion chamber 556 is preferably arranged to burn the atomized waste oil 104 in a centrifugal pattern, causing the heavy fuel elements to move towards the outer sides of combustion chamber 556 where they are consumed. Combustion chamber 556 preferably comprises an upright cylindrical shape, which preferably encloses multi-tube coil 516, more preferably, a circularly wound coil of densely bundled tubes adapted to carry the working fluid. At least one substantially circular inner wall 517 is preferably situate in a position substantially encircling multi-tube coil 516 and is preferably configured to control the cyclonic circulation of hot combustion gases adjacent the coils. The burners 568 are preferably mounted on opposed sides of the circular combustion chamber 556 and are preferably oriented to direct their flames in a spiral circulation pattern. By spinning the flame front around the combustion chamber, multi-tube coil 516 is repetitively "washed" by the heat of the combustion gas. The centrifugal motion of the combustion gases causes the heavier, unburned particles suspended in the gases to accumulate on the outer wall of the combustion chamber where they are incinerated. This cyclonic circulation of combustion gases within the combustion chamber creates higher efficiency in the engine. Exhaust gases 533 are preferably discharged from combustion chamber 556 via at least one exhaust path 562, as shown.

To further increase engine efficiency, the incoming flow of combustion air 555 is preferably preheated in at least two heat exchangers prior to combustion. As most clearly illustrated in FIG. 13A, air intake path 550 is routed through condenser 512 that preferably functions as a first heat exchanger 564 to preheat the flow of combustion air 555. Ambient air preferably enters the condenser 512 by the action of air blower 552 and is preferably circulated over the internal condenser plates to cool the outer surfaces of the plates and condense the exhaust steam circulating within the plates. The incoming flow of combustion air 555 is thus heated using the latent heat of vaporization extracted the condensation of the working fluid within condenser 512.

In addition, air intake path 550 preferably comprises a second heat exchanger 566 to further preheat the flow of combustion air 555 (to about 320° F.) using heat extracted from the hot combustion gases exhausted through exhaust path 562, as shown. Second heat exchanger 566 preferably comprises an air-to-air heat exchanger configured to transfer heat from the exhaust gases 533 exiting combustion chamber 556 to the flow of combustion air 555 entering combustion chamber 556, as shown.

The outer engine shrouding 572 preferably comprises an insulated cover that encloses combustion chamber 556 and reciprocating piston section 511. Outer engine shrouding 572 preferably incorporates the air transfer ducts that channel air from condenser 512 to the intake portion of second heat exchanger 566. Outer engine shrouding 572 also preferably includes return ducts that capture the combustion exhaust gases and leads these gases back through the exhaust portion of second heat exchanger 566. The preferred engine shrouding preferably adds to the efficiency and compactness of the engine by conserving heat with its insulation, providing necessary ductwork for the airflow of the engine, and incorporating the above-noted heat exchanging structures. It is noted that the configuration and operation of such a combustion heater is described in greater detail in, for example, U.S. Patent application 2007/0261681 to Schoell and issued U.S. Pat. No. 7,407,382 to Schoell, incorporated herein by reference for further examples of implementation engineering.

In preferred operation, the working fluid (preferably water) is pumped by feedwater pump 514 from condenser 512 to combustion heater 504 through condensate feed line 515. The working fluid entering combustion heater 504 through condensate feed line 515 is preferably transferred to multi-tube coil 516 within combustion heater 504. The working fluid within multi-tube coil 516 is preferably vaporized by combustion heat generated by the burning of the environmentally hazardous waste oil 104 within combustion heater 504 (at least embodying herein at least one vaporizer structured and arranged to vaporize a working fluid using the combustion heat produced by such at least one combustion heater). Temperatures in multi-tube coil 516 are preferably maintained at approximately 1,200 degrees Fahrenheit. Such heating preferably produces high-pressure super-heated steam that is preferably transferred by at least one fluid delivery line 546 to at least one injector valve 548, preferably a needle-type valve configured to be operable between a closed position and at least one open position, to release a pressurized charge of the vaporized working fluid into at least one of the cylinders 518. The reciprocating motion of piston 520 within the cylinder 518 is preferably induced by this injection of the vaporized working fluid into cylinder 518 upon the momentary opening of injector valve 548. The injected steam expands in an explosive action on the top of the piston, at high pressure, forcing piston 520 down and drivingly rotating the linked crank disk 526 and crankshaft 522. The speed and torque of the engine are controlled by a rocker and cam arrangement which is preferably configured to control the timing of the actuation of injector valve 548. The working fluid preferably exits cylinder 518 through a plurality of exhaust transfer passages 530 allowing the working fluid to drop to condenser 512, as shown.

Condenser 512 (at least embodying herein at least one condenser structured and arranged to condense vaporized working fluid exiting such at least one thermodynamic energy converter) is preferably of a crank-driven centrifugal configuration, preferably comprising a stacked arrangement of flat plates surrounding an inner core. The stacked arrangement of the condenser plates preferably provides a large surface area for maximizing heat transfer within a relatively compact volume.

Condensate feed line 515 (at least embodying herein at least one condensate return line to return condensed working fluid from such at least one condenser, to such at least one combustion heater, by the action of such at least one pump) preferably comprises at least one third heat exchanger 554 structured and arranged to preheat the condensed working fluid prior to entering combustion heater 504. Feed-line heat exchanger 554 is preferably configured to circulate the working fluid around at least one exhaust transfer passage 530, causing the working fluid to be heated by steam exhausted from cylinder(s) 518. More particularly, third heat exchanger 554 preferably comprises a set of pre-heating coils 570 surrounding the cylinders vapor exiting exhaust transfer passage 530 passes through a set of pre-heating coils 570 surrounding the cylinders 518. The positioning of these coils adjacent to the cylinder exhaust ports scavenges heat that would otherwise be lost to the system, thereby contributing to the overall efficiency of the engine. The working fluid preheated in third heat exchanger 554 then enters combustion heater 504 where it is again vaporized by combustion heat generated by the burning of the environmentally hazardous waste oil 104. It is noted that the configuration and operation of such pre-heating coils are described in greater detail in, for example, U.S. Patent application 2007/0056288 to Schoell, incorporated herein by reference for further examples of implementation engineering.

The vapor passing through pre-heating coils 570 preferably drops into the core of condenser 512 where centrifugal force from rotation of crankshaft 522 drives the vapor into the inner cavities of the condenser plates. As the vapor changes phase into a liquid, it enters sealed ports on the periphery of the condenser plates. The condensed liquid drops through collection shafts and into a sump at the base of condenser 512. The high pressure feedwater pump 514 (at least embodying herein at least one fluid pump to pump condensed working fluid between such at least one condenser and such at least one vaporizer) returns the condensate liquid from condenser 512 combustion heater 504, completing the fluid cycle of the engine.

As the working fluid exits the preferred single line of each individual cylinder's pre-heating coils 570 on its way to combustion chamber 556, it preferably branches into the two or more lines (per cylinder) preferably forming part of multi-tube coil 516. Under the dynamic conditions of super-critical high temperatures and high pressures, unbalanced flows can occur within the branch lines leading to potential overheating and possible wall failure. To mitigate this problem, at least one splitter valve 574 is preferably located at the branch point of the single line to the multiple lines, as shown. This valve preferably functions to equalizes the flow between the branch lines during operation. It is noted that the configuration and operation of such splitter valves are described in greater detail in, for example, U.S. Patent application 2007/00056287 to Schoell, incorporated herein by reference for further examples of implementation engineering.

At lower engine speeds the steam injector valves 548 are partially closed and a clearance volume compression release valve 576 is preferably opened to release steam from the cylinders. Clearance volume compression release valve 576 is preferably controlled by the engine rotational speed. Minimizing the clearance volume in a cylinder 518 is advantageous for efficiency as it lessens the amount of super-heated steam required to fill the volume, reduces the vapor contact area which absorbs heat that would otherwise be used in the explosive expansion of the power stroke, and, by creating higher compression in the smaller chamber, further raises the temperature of the admitted steam; however, the higher compression resulting from the smaller volume has the adverse effect, at low engine speed, of creating back pressure against the incoming charge of super-heated steam. The purpose of clearance volume compression release valve 576 is to reduce the cylinder compression at lower engine speeds, while maintaining higher compression at faster piston speeds where the back pressure effect is minimal. Clearance volume compression release valve 576 preferably controls the fluid communication between a cylinder 518 and tube 578, which preferably extends from cylinder 518 into the combustion chamber 556. Clearance volume compression release valve 576 is preferably hydraulically operated by the lower-pressure pump system of engine-driven primary feedwater pump 514. At lower engine speeds, clearance volume compression release valve 576 opens the cylinder 518 to tube 578. By adding the incremental volume of this tube to that of the cylinder 518, the total clearance volume is increased with a consequent lowering of the compression. At higher engine speeds, the pump system develops sufficient pressure to close clearance volume compression release valve 576, thereby reducing the total clearance volume, and raising the cylinder compression for efficient higher speed operation of the engine. It is noted that the configuration and operation of such clearance volume compression release valves are described in greater detail in, for example, U.S. Patent application 2007/0256415 to Schoell, incorporated herein by reference for further examples of implementation engineering.

The motion to open each injector valve 548 is preferably initiated by a pushrod 582 engaging a crankshaft mounted cam ring 580. Each pushrod 582 extends from near the center of the radially configured engine outward to a valve rocker 584 configured to actuate an injector valve 548. Throttle control on the engine is preferably achieved by varying the distance each pushrod 582 is extended. All pushrods 582 pass through a throttle control ring 586 that rotates in an arc. Shifting the arc of throttle control ring 586 adjusts the interaction of pushrod 582 with valve rocker 584 to adjust the degree to which injector valve 548 opens. A single lever 588 is preferably attached to throttle control ring 586 and preferably extends to the outside of the engine casing, as shown. Lever 588 is preferably used to shift the arc of throttle ring 586, and thus becomes the engine throttle 591. Timing control of the engine is achieved by hydraulically-actuated adjustment of the position of cam ring 580 on crankshaft 522. Such timing control preferably functions to advance the moment that the vaporized working fluid is injected into each cylinder 518 and shortens the duration of this injection as engine speed increases (for example, 'Upward' movement of the cam ring towards the crankshaft journal preferably alters the timing duration by exposing the pushrod assembly to a lower portion of the cam ring where the profile of the cam is progressively reduced).

It is noted that the configuration and operation of such steam-powered external-combustion piston engine devices are described in greater detail in, for example, U.S. Pat. Nos. 7,080,512; 7,407,382; U.S. patent application Ser. Nos. 11/879,586; 11/879,589; 11/786,845; 11/827,854; 11/827,846; 11/416,039; 11/509,207; and 11/489,335; World Patent application WO 2006/031907; World Patent application WO 2006/031907; World Patent application WO 2008/010969; World Patent application WO 2008/010971; World Patent application WO 2008/010998; World Patent application WO 2008/011036; World Patent application WO 2008/011036; World Patent application WO 2008/011037; World Patent application WO 2008/011038; World Patent application WO 2008/011040; World Patent application WO 2008/027364; and World Patent application WO 2008/027364; each one incorporated herein by reference for further examples of implementation engineering.

Figure 14:
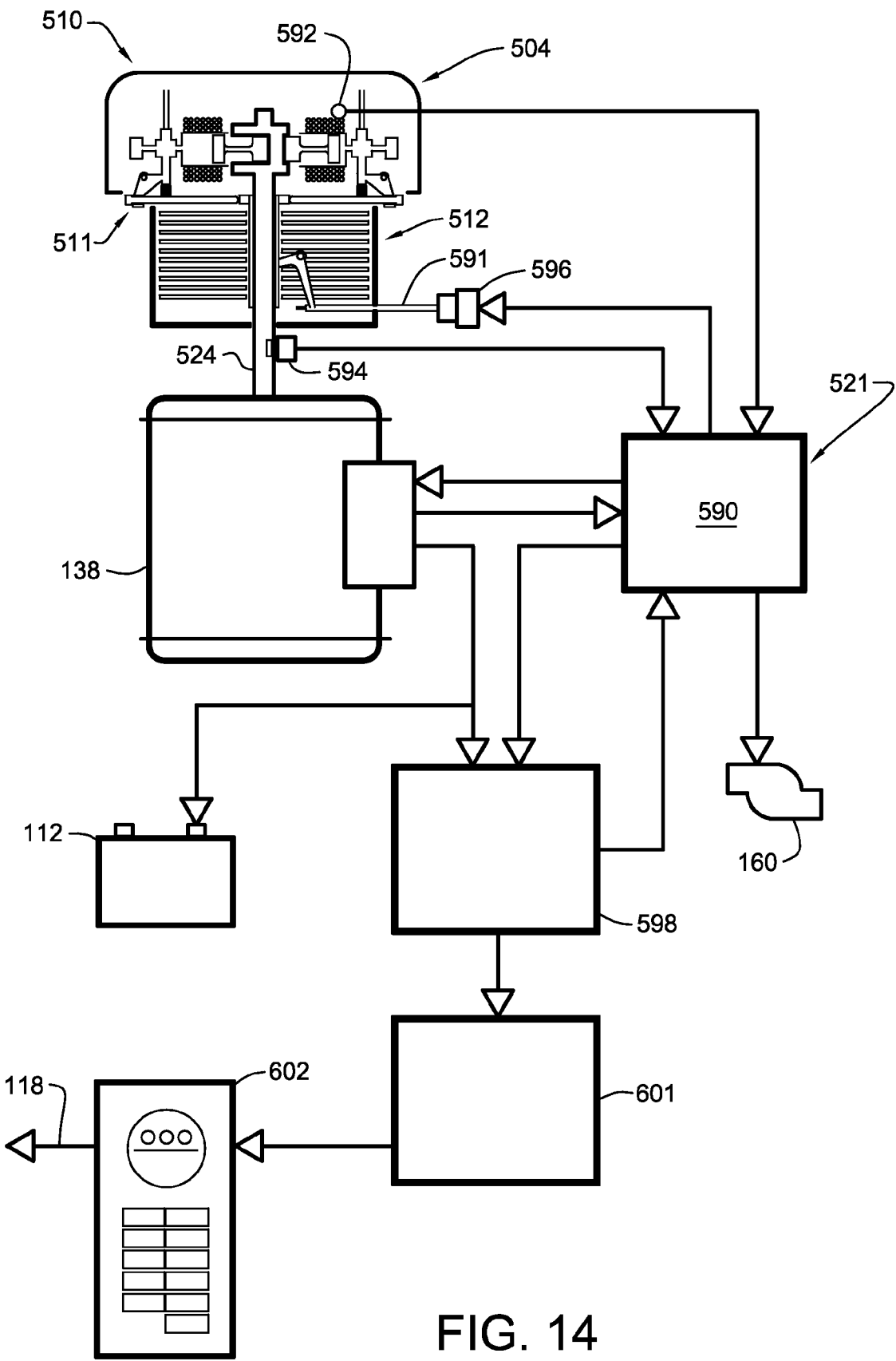
FIG. 14 is a schematic diagram illustrating preferred functional control and distribution arrangements of the waste-oil driven electrical generation unit of FIG. 11.

FIG. 14 is a schematic diagram illustrating preferred functional control and distribution arrangements of waste-oil driven electrical generation unit 502 of FIG. 11. Engine control is preferably provided buy a microprocessor-based onboard electrical control subsystem 521, preferably including one or more electronic controllers 590, as shown. Preferred monitoring, diagnosis, and control features of controller 590 preferably include voltage regulation, network protection, PLC-based control of pumps (such as, waste oil pump 160), engine control, engine protection, and alarms.

Engine throttle control by controller 590 is preferably implemented by means of throttle control actuator 596 coupled to engine throttle 591, as shown (at least embodying herein wherein such at least one power controller comprises at least one engine control structured and arranged to control levels of mechanical power output by such at least one external-combustion heat engine). Engine protection may preferably comprise the monitoring of engine operating temperature via temperature sensor(s) 592 in conjunction with the monitoring of engine speed via engine speed sensor(s) 594.

Sensors (crank angle, temperature sensors, etc.) are preferably located in accordance with the recommendations of the component's respective manufacturer. Other preferred monitoring and control features may alternately include air fuel mixture control, synchronization, power factor (Cos-PHI) monitoring, and varistor monitoring, as applicable. Generator measurements by controller 590 may preferably comprise voltage (U), current (I), frequency (Hz), power (kW), reactive power (kvar), apparent power (kVA), power factor (PF), kW hours (kWh) and reactive power hours (kVAh), and mains measurements U, I, and Hz.

Electrical generator 138 preferably comprises a four-pole synchronous generator preferably outputting three-phase alternating current (AC). In a preferred embodiment of the present system, electrical generator 138 preferably comprises a peak output capacity of about 40 kW (at least embodiment of the present invention at least one electrical generator structured and arranged to generate electrical power using the mechanical power produced by such at least one external-combustion heat engine). Upon reading this specification, those with ordinary skill in the art will understand that, under appropriate circumstances, such as commercial availability, user preference, advances in technology, etc., other generator arrangements, such as, for example, DC generators, generators of larger or smaller "scalable" capacity, etc., may suffice.

In a preferred embodiment, the system preferably comprises a net-metering capability whereby the output of electrical generator 138 is coupled to a commercially available grid-tied inverter 598 and regen controller 601 (as required). Thus, any power in excess of that used by onsite loads 606 can be fed directly into the utility grid through electrical meter 602, as shown. Alternately preferably, the system may comprise a grid-independent arrangement whereby excess power is fed to a local energy storage system 112, as shown.

Figure 15:
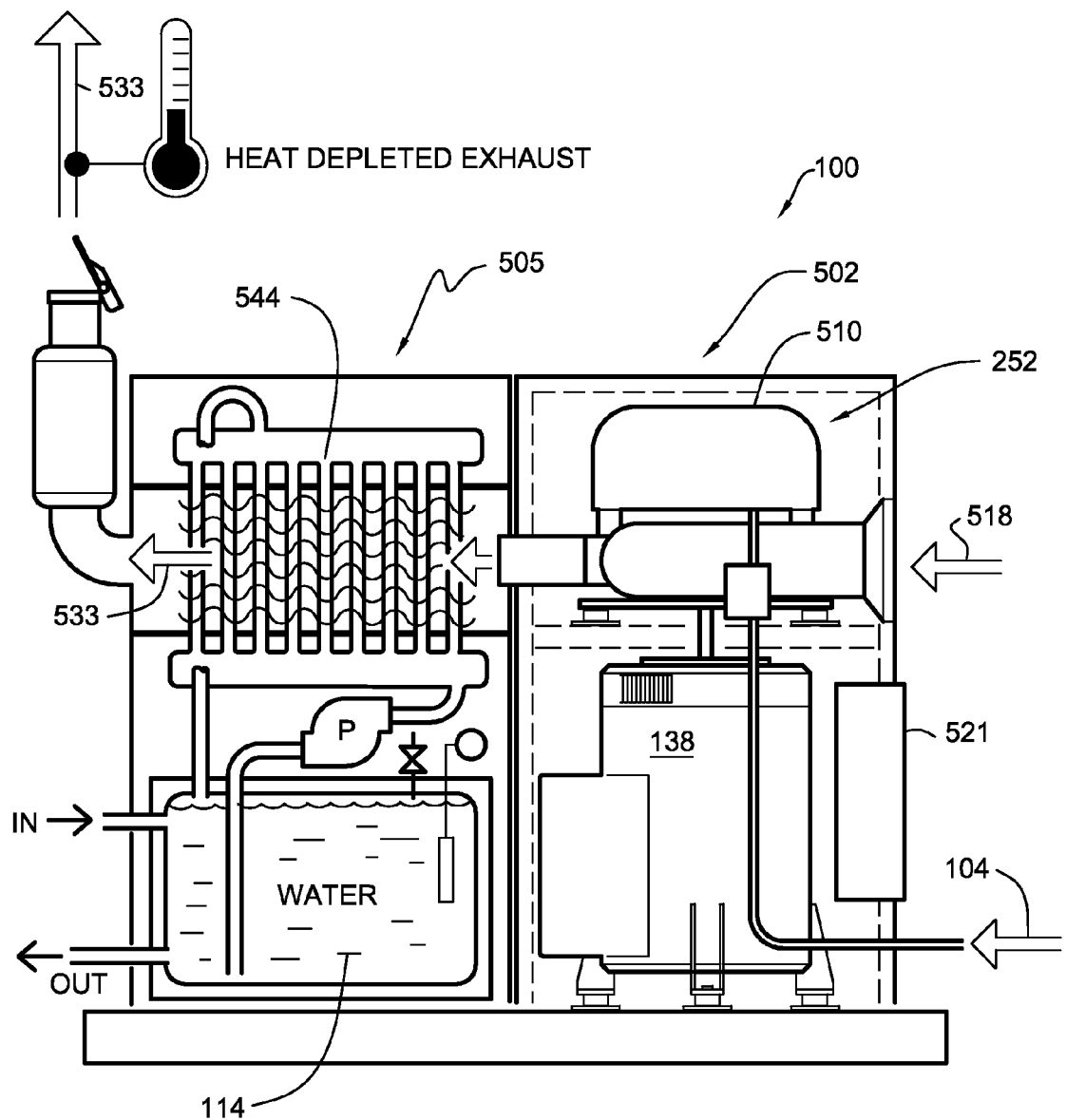
FIG. 15 is a diagrammatic illustration, partially in section, of the waste-oil electrical generation unit of FIG. 11, coupled to a preferred modular waste-heat-recovery unit for the generation of hot water.

FIG. 15 is a diagrammatic illustration, partially in section, of waste-oil electrical generation unit 502 of FIG. 11, coupled to a preferred modular waste-heat-recovery unit 505 for the generation of hot water 114. Modular waste-heat-recovery unit 505 is preferably used to recover heat from exhaust gases 533 exiting waste-oil electrical generation unit 502 (typically comprising a temperature of about 320° F.). In the preferred embodiment of FIG. 15, modular waste-heat-recovery unit 505 preferably comprises waste-heat exchanger 544 (at least embodying herein at least one waste-heat heat exchanger structured and arranged to transfer at least one portion of the combustion heat to at least one heatable fluid). Waste-heat exchanger 544 is preferably brought into thermal relationship with exhaust gases exiting combustion heater 504, as shown. Waste-heat exchanger 544 is preferably used to supply domestic hot water 114. Upon reading this specification, those with ordinary skill in the art will now appreciate that, under appropriate circumstances, considering such issues as local requirements, user preference, etc., other waste-heat heat recovery arrangements such as, for example, producing hot air (for space-heating), etc., may suffice.

Figure 16:
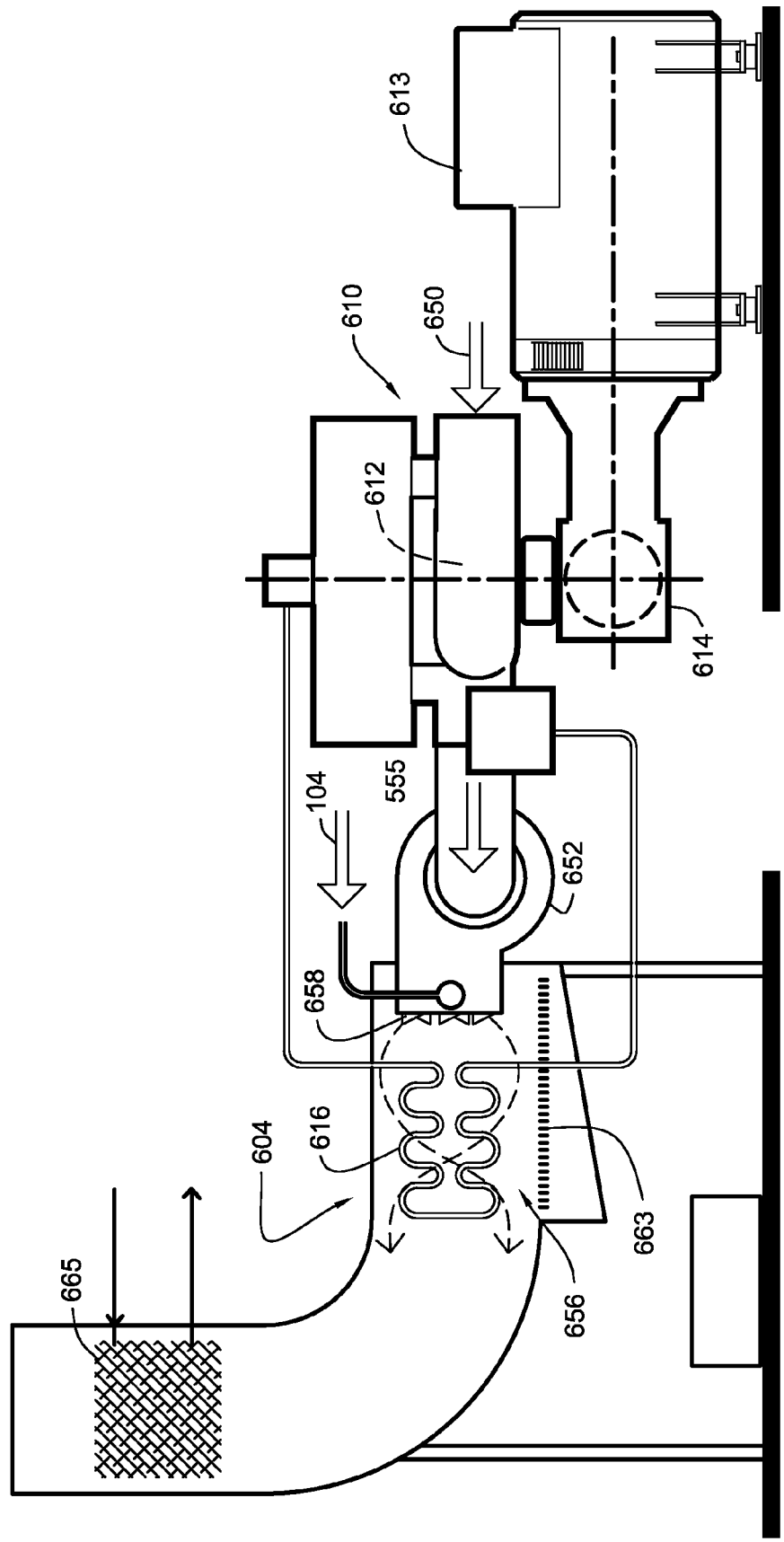
FIG. 16 is a diagrammatic illustration of a high-capacity waste-oil driven electrical generation unit, according to another preferred embodiment of the present invention.

FIG. 16 is a diagrammatic illustration of a high-capacity waste-oil driven electrical generation unit 600, according to another preferred embodiment of the present invention. Waste-oil driven electrical generation unit 600 preferably comprises at least one separately-mounted combustion heater 604 located apart from its respective reciprocating piston section 610, as shown. It is noted that the preferred reciprocating piston section 610 of waste-oil driven electrical generation unit 600 is substantially similar in structures and arrangements to that of reciprocating piston section 511.

The alternate combustion heater 604 preferably comprises at least one air intake path 650, preferably comprising at least one air blower 652, preferably configured to deliver a flow of combustion air 555 to combustion chamber 656 of combustion heater 604, as shown. Combustion chamber 656 preferably comprises an arrangement of burners 668, preferably containing at least one atomizer 658, preferably configured to produce an atomized mist of waste oil 104 within the flow of combustion air 555. At least one ignition source is preferably used to ignite the atomized mist of waste oil 104 suspended within the flow of combustion air 555.

Combustion chamber 656 is preferably arranged to burn the atomized waste oil 104 in a centrifugal pattern, causing the heavy fuel elements to move towards the outer sides of combustion chamber 656 where they are consumed. Any remaining carbon is preferably removed, as required, via discharge ports 663 at the base of combustion chamber 656. Upon reading this specification, those with ordinary skill in the art will now appreciate that, under appropriate circumstances, considering such issues as cost, heater configuration, etc., other carbon management arrangements such as, for example, vibratory shedding, centrifugal shedding, etc., may suffice.

Combustion chamber 656 preferably comprises a cylindrical shape, which preferably encloses multi-tube coil 616, more preferably, a circularly wound coil of densely bundled tubes adapted to carry the working fluid between the heater and piston section. The burners 668 are preferably oriented to direct their flames in a spiral circulation pattern. By spinning the flame front around the combustion chamber, multi-tube coil 616 is repetitively "washed" by the heat of the combustion gas. The centrifugal motion of the combustion gases also causes the heavier, unburned particles suspended in the gases to accumulate on the outer wall of the combustion chamber where they are incinerated or shed through discharge port 663.

Air blower 652 preferably draws combustion air 555 through condenser 612 of waste-oil driven electrical generation unit 600 where combustion air 555 is preferably preheated. Upon reading this specification, those with ordinary skill in the art will now appreciate that, under appropriate circumstances, considering such issues as cost, efficiency requirements, etc., other heat transfer arrangements such as, for example, adding a second air-to-air heat exchanger the combustion air path to further preheat the air using waste combustion heat, etc., may suffice.

The mechanical output of waste-oil driven electrical generation unit is preferably coupled to a horizontal-shaft electrical generator 613 via gearbox 614, as shown. Upon reading this specification, those with ordinary skill in the art will now appreciate that, under appropriate circumstances, considering such issues as engine configuration, cost, etc., other coupler arrangements such as, for example, the use of specific gear-reduction assemblies, vibration dampers, clutch mechanisms, universal joints, fluid or magnetic couplers, etc., may suffice. Furthermore, those with ordinary skill in the art will now appreciate that, under appropriate circumstances, considering such issues as engine efficiency, maximum engine outputs, cost, etc., other generator arrangements such as, for example, the use of a large 2-pole generator to allow the prime mover to operate at peak (high RPM) efficiency, etc., may suffice.

Waste-heat-recovery from the hot exhaust gases 533 is preferably accomplished by installing one or more heat exchangers 665 adjacent combustion chamber 656 and/or within the exhaust path, as shown. Thus, waste heat of the combustion can be used to heat at least one secondary heatable fluid, such as air or water. In an alternate preferred embodiment of the system, heat exchanger 665 is operably coupled to a low-temperature organic Rankine cycle engine (used for secondary mechanical/electrical power production). Such working fluids preferably comprise an organic compounds exhibiting a phase-change temperature lower than water at a given temperature (at least embodying herein wherein the working fluid is at least one organic fluid comprising at least one liquid-vapor phase occurring at a lower temperature than that of water at a given pressure). Preferred working fluids include isobutane, propane, high-boiling refrigerants such as R134a, R113, R245ca, R245fa, R123, and the like.

It should be noted that the term "environmentally hazardous waste oils", as used within this specification and the below claims, shall include within the definition, vegetable oils and similar oils used within the food industry. Furthermore, upon reading this specification, those with ordinary skill in the art will understand that, under appropriate circumstances, such as, for example, new industries, advances in processing technology, etc., the use of other oils, such as, synthetic oil, bio-engineered oils, etc., may suffice.

Although applicant has described applicant's preferred embodiments of this invention, it will be understood that the broadest scope of this invention includes such modifications as diverse shapes and sizes and materials. Such scope is limited only by the below claims as read in connection with the above specification. Further, many other advantages of applicant's invention will be apparent to those skilled in the art from the above descriptions and the below claims.

What is claimed is:

1. A system related to mechanical power generation through the burning of environmentally hazardous waste oils, said system comprising:
   a) at least one combustion heater structured and arranged to produce combustion heat through the burning of such environmentally hazardous waste oils;
   b) at least one vaporizer structured and arranged to vaporize a working fluid using the combustion heat produced by said at least one combustion heater;
   c) at least one thermodynamic energy converter structured and arranged to convert heat extracted from combustion of the vaporized working fluid into at least one output of mechanical work;
   d) at least one condenser structured and arranged to condense vaporized working fluid exiting said at least one thermodynamic energy converter; and
   e) operably coupled with said at least one condenser, at least one fluid pump to pump condensed working fluid between said at least one condenser and said at least one vaporizer;
   f) wherein said at least one combustion heater comprises
      i) at least one air intake path, comprising at least one air blower, structured and arranged to deliver at least one combustion airflow to said at least one combustion heater,
      ii) at least one atomizer structured and arranged to produce an atomized mist of such environmentally hazardous waste oils within the at least one combustion airflow,
      iii) at least one ignition source to ignite the atomized mist of such environmentally hazardous waste oils within the at least one combustion airflow, and
      iv) at least one exhaust path to exhaust hot combustion gases from said at least one combustion heater;
   g) wherein said at least one air intake path comprises at least one first heat exchanger to preheat the at least one combustion airflow using the latent heat of vaporization extracted from the condensation of the working fluid within said at least one condenser; and
   h) wherein said at least one air intake path comprises at least one second heat exchanger to preheat the at least one combustion airflow using heat extracted from the hot combustion gases exhausted through said at least one exhaust path.

2. The system according to claim 1 wherein said at least one exhaust path further comprises at least one waste-heat exchanger structured and arranged to transfer at least one portion of the combustion heat to at least one secondary heatable fluid.

3. The system according to claim 2 wherein said at least one waste-heat exchanger is structured and arranged to transfer the combustion heat to air, usable for space heating.

4. The system according to claim 2 wherein the secondary heatable fluid comprises at least one liquid.

5. The system according to claim 1 further comprising:
   a) at least one holder structured and arranged to hold such environmentally hazardous waste oils; and
   b) at least one waste-oil transfer component structured and arranged to transfer such environmentally hazardous waste oils from said at least one holder to said at least one combustion heater.

6. The system according to claim 1 wherein said at least one waste oil transfer component comprises:
   a) at least one waste-oil pre-heater structured and arranged to preheat such environmentally hazardous waste oils prior to burning;
   b) wherein said at least one at least one waste-oil pre-heater is further structured and arranged to operate using the combustion heat produced by the burning of such environmentally hazardous waste oils.

7. The system according to claim 1 wherein said at least one thermodynamic energy converter comprises at least one external-combustion heat engine.

8. The system according to claim 7 wherein said at least one external-combustion heat engine comprises at least one Rankine-cycle heat engine.

9. The system according to claim 7 wherein the working fluid is water.

10. The system according to claim 7 wherein the working fluid is at least one organic fluid comprising at least one liquid-vapor phase occurring at a lower temperature than that of water at a given pressure.

11. The system according to claim 7 wherein said at least one external-combustion heat engine comprises at least one steam-driven turbine engine.

12. The system according to claim 9 wherein said at least one external-combustion heat engine comprises:
 a) at least one cylinder;
 b) at least one piston reciprocally disposed within said at least one cylinder;
 c) at least one crankshaft to translate motion of said at least one piston into rotation;
 d) at least one crank disk fitted to said at least one crankshaft and rotatable therewith;
 e) at least one connecting rod pivotally connected between said at least one piston and said at least one crank disk; and
 f) at least one injector valve, operable between a closed position and at least one open position, to release a pressurized charge of the vaporized working fluid into said at least one cylinder;
 g) at least one fluid delivery line to deliver the vaporized working fluid from said at least one combustion heater to said at least one injector valve, wherein motion of said at least one piston is induced by injection of the vaporized working fluid into said at least one cylinder upon momentary opening of said at least one injector valve; and
 h) at least one exhaust transfer passage structured and arranged to exhaust the working fluid from said at least one cylinder to said at least one condenser.

13. The system according to claim 12 wherein said at least one external-combustion heat engine further comprises:
 a) at least one condensate return line to return condensed working fluid from said at least one condenser, to said at least one combustion heater, by the action of said at least one pump;
 b) wherein said at least one condensate return line comprises at least one third heat exchanger structured and arranged to heat the condensed working fluid prior to entering said at least one combustion heater; and
 c) wherein said at least one third heat exchanger utilizes heat extracted from the vaporized working fluid exhausted from said at least said one cylinder through said at least one exhaust transfer passage.

14. The system according to claim 13 wherein said at least one combustion heater further comprises:
 a) in fluid communication with said at least one fluid delivery line and said at least one condensate return line, at least one multi-tube coil comprising a plurality of individual tubes wound in at least one bundle and each of said plurality of tubes being structured and disposed for passage of the working fluid therethrough;
 b) situate in a position substantially encircling said at least one multi-tube coil, at least one substantially circular inner wall structured and arranged to control at least one cyclonic circulation of the hot combustion gases adjacent said at least one multi-tube coil; and
 c) at least one combustion nozzle assembly structured and arranged to produce the at least one cyclonic circulation of the hot combustion gases adjacent said at least one multi-tube coil;
 d) wherein said at least one combustion nozzle assembly comprises said at least one atomizer and said at least one air blower for producing such cyclonic circulation of hot combustion gases.

15. The system according to claim 13 further comprising at least one electrical generator structured and arranged to generate electrical power using the mechanical power produced by said at least one external-combustion heat engine.

16. The system according to claim 15 further comprising at least one electrical network electrically coupled to said at least one electrical generator and at least one on-site load.

17. The system according to claim 16 further comprising:
 a) at least one power controller structured and arranged to control the output of the electrical power of said at least one electrical generator to said at least one electrical network;
 b) wherein said at least one power controller comprises at least one engine control structured and arranged to control levels of mechanical power output by said at least one external-combustion heat engine.

18. The system according to claim 17 wherein said at least one electrical network further comprises:
 a) at least one electrical storage device structured and arranged to store the electrical power within at said at least one electrical network; and
 b) at least one electrical-controller structured and arranged to control the transfer of the electrical power between said at least one electrical storage device and said at least one on-site load.

19. The system according to claim 17 wherein said at least one electrical network further comprises at least one connection to at least one larger electrical grid.

20. A system related to on-site burning of on-site-generated waste oils for the purpose of on-site electrical power generation, said system comprising:
 a) at least one holder structured and arranged to hold such on-site-generated waste oils;
 b) at least one combustion heater structured and arranged to produce combustion heat by burning such on-site-generated waste oils;
 c) at least one waste oil transfer component structured and arranged to transfer such on-site-generated waste oils from at least one holder to said at least one combustion heater; and
 d) operably coupled to said at least one combustion heater, at least one heat-energy converter structured and arranged to convert such combustion heat to electrical power;
 e) wherein said at least one heat energy converter comprises
  i) at least one Rankine-cycle external-combustion heat engine structured and arranged to convert such combustion heat to mechanical power, and
  ii) operationally coupled to said at least one Rankine-cycle external-combustion heat engine, at least one electrical generator adapted to the generate electrical power;
 f) wherein said at least one holder comprises at least one collector structured and arranged to assist in on-site collecting of such on-site-generated waste oils;
 g) wherein said at least one waste oil transfer component comprises at least one waste-oil pump to pump such on-site-generated waste oils from said at least one holder to said at least one combustion heater;
 h) wherein said at least one combustion heater comprises:
  i) at least one atomizer structured and arranged to atomize such on-site-generated waste oils prior to combustion; and ii) at least one igniter adapted to ignite such on-site-generated waste oils after such on-site-generated waste oils have passed through said at least one atomizer.

21. The system according to claim 20 further comprising at least one waste-heat exchanger structured and arranged to transfer at least one portion of the combustion heat to at least one secondary heatable fluid.

22. The system according to claim 20 further comprising at least one on-site electrical circuit adapted to utilize the electrical power.

23. The system according to claim 22 wherein said at least one electrical network comprises at least one electrical controller structured and arranged to control electrical power within said at least one electrical network.

24. The system according to claim 23 wherein:
a) said at least one electrical network further comprises at least one electrical storage device structured and arranged to store electrical power; and
b) said at least one electrical controller is structured and arranged to control at least one transfer of electrical power between said at least one electrical storage device and said at least one electrical network.

25. The system according to claim 24 wherein said at least one electrical controller is structured and arranged to control transfers of electrical power between said at least one electrical network and at least one larger electrical grid.

* * * * *